(12) United States Patent
Liu

(10) Patent No.: US 12,301,150 B2
(45) Date of Patent: May 13, 2025

(54) DIGITAL POWER CONVERTER ARRANGEMENT OF ELECTRIC VEHICLE

(71) Applicant: Michael Liu, Vancouver (CA)

(72) Inventor: Michael Liu, Vancouver (CA)

(*) Notice: Subject to any disclaimer, the term of this patent is extended or adjusted under 35 U.S.C. 154(b) by 260 days.

(21) Appl. No.: 18/103,569

(22) Filed: Jan. 31, 2023

(65) Prior Publication Data

US 2024/0258950 A1 Aug. 1, 2024

(51) Int. Cl.
| | |
|---|---|
| *H02P 27/08* | (2006.01) |
| *B60L 15/00* | (2006.01) |
| *B60L 15/08* | (2006.01) |
| *B60L 50/51* | (2019.01) |
| *H02M 1/00* | (2006.01) |
| *H02M 7/5387* | (2007.01) |

(52) U.S. Cl.
CPC .......... *H02P 27/085* (2013.01); *B60L 15/007* (2013.01); *B60L 15/08* (2013.01); *B60L 50/51* (2019.02); *H02M 1/0009* (2021.05); *H02M 7/53873* (2013.01); *H02M 7/53875* (2013.01); *B60L 2210/40* (2013.01)

(58) Field of Classification Search
CPC ...... H02P 27/085; H02P 27/10; H02P 27/024; H02P 27/04; H02P 27/045; H02P 27/048; H02P 27/05; H02P 27/06; H02P 27/08; B60L 50/51; B60L 50/52; B60L 50/53; B60L 15/007; B60L 15/20; H02M 1/0009
See application file for complete search history.

(56) References Cited

U.S. PATENT DOCUMENTS

| | | | |
|---|---|---|---|
| 9,172,317 B2 * | 10/2015 | Ishida | H02P 25/22 |
| 2021/0044243 A1 * | 2/2021 | Hara | H02P 27/085 |
| 2024/0372497 A1 * | 11/2024 | Xie | H02P 27/14 |

\* cited by examiner

*Primary Examiner* — Nguyen Tran
(74) *Attorney, Agent, or Firm* — Raymond Y Chan; David & Raymond Patent Firm

(57) ABSTRACT

A digital power converter arrangement of an electric vehicle includes a CPU circuit and a function selection circuit. The CPU circuit is configured to execute and perform analog and digital conversion, pulse-width modulation and communication, including a CPU outputting one or more PWM signals by changing a time ratio of a turn-on/turn-off of square wave pulse width modulation signals. The function selection circuit includes a function selector switch configured to switch between an external battery charging function mode, an AC power supply output function mode, and an external motor driver function mode, and a motor selector switch configured to function a motor hall mode when the function selector switch is switched to the external motor driver function mode, wherein the CPU detects the function selector switch and motor selector switch to switch states to run corresponding functions.

21 Claims, 20 Drawing Sheets

DIGITAL POWER CONVERTER ARRANGEMENT OF ELECTRIC VEHICLE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to digital power converter, and more particularly to a digital power converter arrangement of electric vehicle for providing power conversion, motor driving, self-charging, and communication functions of electric vehicle such as electric automobile, electric ship or boat, or the like.

Description of Related Arts

Nowadays, the market of electric vehicles, such as electric automobile, electric ship or boat, and the like, is developing rapidly. The batteries to be used in electric vehicles have also developed from lead-acid batteries to lithium-iron batteries, and the battery voltage has also increased from 12V/24V, to 200V/400V. Practically, it is developing to 800V.

In U.S. Pat. No. 8,421,271, an apparatus that includes an energy storage device, a bi-directional DC-to-DC voltage converter coupled to the energy storage device, and an input device is disclosed, which is configured to control the bi-directional DC-to-DC voltage converter to convert the charging energy into a charging energy configured to maintain the voltage of the energy storage device at a predetermined value.

In U.S. Pat. No. 9,238,415, an apparatus for rapid charging is disclosed, which uses onboard power electronics including a DC bus, a first energy storage device coupled to the DC bus and configured to output a DC voltage, a first bi-directional voltage modification assembly coupled to the DC bus, and a high impedance voltage source couplable to the DC bus, wherein a controller is programmed to control a simultaneous transfer of charging energy through the first and second receptables of the charging system to the DC bus.

In PCT application, PCT/FR2017/052553, a conversion device is disclosed, which allows electrical energy to be transferred between a DC network and an AC network and includes a DC-to-DC converter comprising a first switch, a second switch, and a low-voltage branch and a high-voltage branch, each comprising two sub-branches in series, each sub-branch comprising a switching module; an AC-to-DC converter; a controller that is configured to control the closed or open state of the first switch, of the second switch and of each switching module, the controller being, additionally, configured to control the AC-to-DC converter for transferring electrical energy from the DC-to-DC converter to the AC network, or from the AC network top the DC-to-DC converter.

In order to adapt the development of the electric vehicle market, both the DC-to-DC converter and the AC-to-DC- converter are utilized in electric vehicle. However, it would be an ideal inventive concept to provide electric vehicle an AC output for multiple utility functions thereof.

SUMMARY OF THE PRESENT INVENTION

The invention is advantageous in that it provides a digital power converter arrangement configured to be built-in an electric vehicle, wherein one or more CPU component is implemented with supported software to produce PWM output signal function and ADC conversion function, so as to provide AC output for the electric vehicle.

The present invention provides AC power function, motor drive function, communication function, and self-charging function, The AC output function provides power supply for various audio-visual equipment in electric vehicles, The motor drive function provides various small motor drives for electric vehicles, such as wiper motors, air-conditioning motors, directional motors, etc., The communication function can be connected with the intelligent control system of electric vehicles, The self-charging function provides the possibility of independent operation of the present invention Another advantage of the invention is to a digital power converter arrangement of electric vehicle that is capable of providing AC power function for providing power supply for one or more audio-video equipment in the electric vehicle, motor driving function for driving utility motors in the electric vehicle such as wiper motor, air-conditioning motor, directional motor, and the like, communication function for connecting with the intelligent control system of the electric vehicle, self-charging function for providing independent operation of the digital power converter, and etc.

Additional advantages and features of the invention will become apparent from the description which follows, and may be realized by means of the instrumentalities and combinations particular point out in the appended claims.

According to the present invention, the foregoing and other objects and advantages are attained by a digital power converter of electric vehicle, including:

at least one external battery;
at least one external motor; and
a digital power converter which includes:
a signal switching IC (Integrated Circuit); and
a CPU (Central Processor Unit) circuit, configured to execute and perform analog and digital conversion, pulse-width modulation (PWM) and communication, including a CPU outputting one or more PWM signals by changing a time ratio of a turn-on/turn-off of square wave pulse width modulation signals;
an AC (Alternate Current) rectifier circuit configured to input AC power supply, wherein the CPU outputs the PWM signals through the signal switching IC to switch to the voltage boost circuit to raise an AC rectifier voltage to reach an external battery voltage potential of each of the at least one external battery;
a voltage boost circuit which utilizes software to change IO output states of the PWM signals;
a high voltage filter circuit configured to detect voltage and current data of one or more input terminals of the AC rectifier circuit;
a three-phase inverter circuit configured to expand power conversion into a three-phase AC output with three-phase motor driving capability to provide a three-phase power supply with the CPU as a control core to quantitatively analyze and process input and output information and make corresponding adjustments thereof; and a function selection circuit, including:
  a function selector switch configured to switch between an external battery charging function mode, an AC power supply output function mode, and an external motor driver function mode; and
  a motor selector switch configured to function a motor hall mode when the function selector switch is switched to the external motor driver function mode, wherein the CPU detects the function selector switch and motor selector switch to switch states to run corresponding functions.

In one embodiment, when the function selector switch is switched to select the external battery charging function mode, the CPU operates in a charging mode, wherein an external AC power is supplied via the AC rectifier circuit and an external AC current thereof is rectified to obtain a DC voltage, wherein the DC voltage is raised by the voltage boost circuit and then feeds to the high voltage filter circuit to filter out any pulsating voltage for charging the at least one external battery.

In one embodiment, when the function selector switch is switched to select the AC power supply function mode that is a power source switching mode, the at least one external battery inputs a DC power through the high voltage filter circuit and then switches into AC power supply through a three-phase driver to output, wherein the AC power supply raises a voltage thereof by the voltage boost circuit to supplement a power loss of the at least one external battery.

In one embodiment, when the function selector switch is switched to select the external motor driver function mode, the high voltage filter circuit is connected with the at least one external battery to input DC power supply, wherein the CPU sets a driving voltage through an adjustable potentiometer and a rotating speed of the at least one external motor, and that AC power is rectified by the AC rectifier circuit to output steady direct current for an operation of the at least one external motor.

In one embodiment, the digital power converter further includes a hall sensor interface circuit, wherein when the motor selector switch of the function selection circuit is switched to the motor hall mode, a rotation angle feedback information based on a selection of a three-phase brushless motor of the one or more motor is provided from the hall sensor interface circuit, wherein the fall sensor interface circuit includes three operational amplifiers configured to filter out noise from three-phase hall sensor signals inputted and then reform to square wave to output and then reform to square wave to output, two fall sensor interface circuit resistors configured to divide voltage potential for providing a trigger voltage potential that an input signal at an input terminal thereof is a low voltage potential which is lower than the trigger voltage potential, and an output signal at an output terminal thereof is a high voltage potential which is higher than the trigger voltage potential, such that the CPU is able to determine the rotation angle of the at least one external motor according to signal states for processing a computation of PWM signal parameters to correct output PWM signal parameters.

In one embodiment, the digital power converter further includes an external module interface circuit, wherein when the motor selector switch of the function selection circuit is switched to a motor feedback mode, a rotation angle feedback information is provided based on a rotary transformer of the at least one external motor, wherein the feedback information requires the external module interface circuit to decode an angular motor information, such that the CPU controls an external module through the external module interface circuit which includes an external module terminal, wherein the CPU is able to connect with a decoding module of the rotary transformer of the external module through the external module terminal, and that the CPU is linked with the external module through a built-in SPI communication module for information exchange, control status information exchange, and providing a 5V power source.

In one embodiment, the digital power converter further includes an output current detection circuit, wherein when the motor selector switch of the function selection circuit is switched to a motor AC mode, a motor based on no rotation angle feedback is selected, wherein the CPU detects a motor current phase information through the output current detection circuit for processing a computation of the PWM signal parameters to correct the output PWM signal parameters.

In one embodiment, the digital power converter further comprises an external communication network interface circuit communicatively linking an external CAN bus based on a CAN bus communication standard and the function selector switch is able to selectively switch to an input control instruction function mode via an external network, wherein when the function selector switch is switched to the input control instruction function mode, a CAN port of the CPU executes a communication operation mode, whereby when the power source is under a "STANDBY" status, an external device is able to transmit control signals and instructions via a CAN bus communication network through the external communication network interface circuit, wherein the CPU is built-in with a communication module to decode the CAN bus inputted information and read control signals and instructions so as to execute functions of the digital power converter of the electric vehicle according to the control signals and instructions.

Still further objects and advantages will become apparent from a consideration of the ensuing description and drawings.

These and other objectives, features, and advantages of the present invention will become apparent from the following detailed description, the accompanying drawings, and the appended claims.

Figure 1:
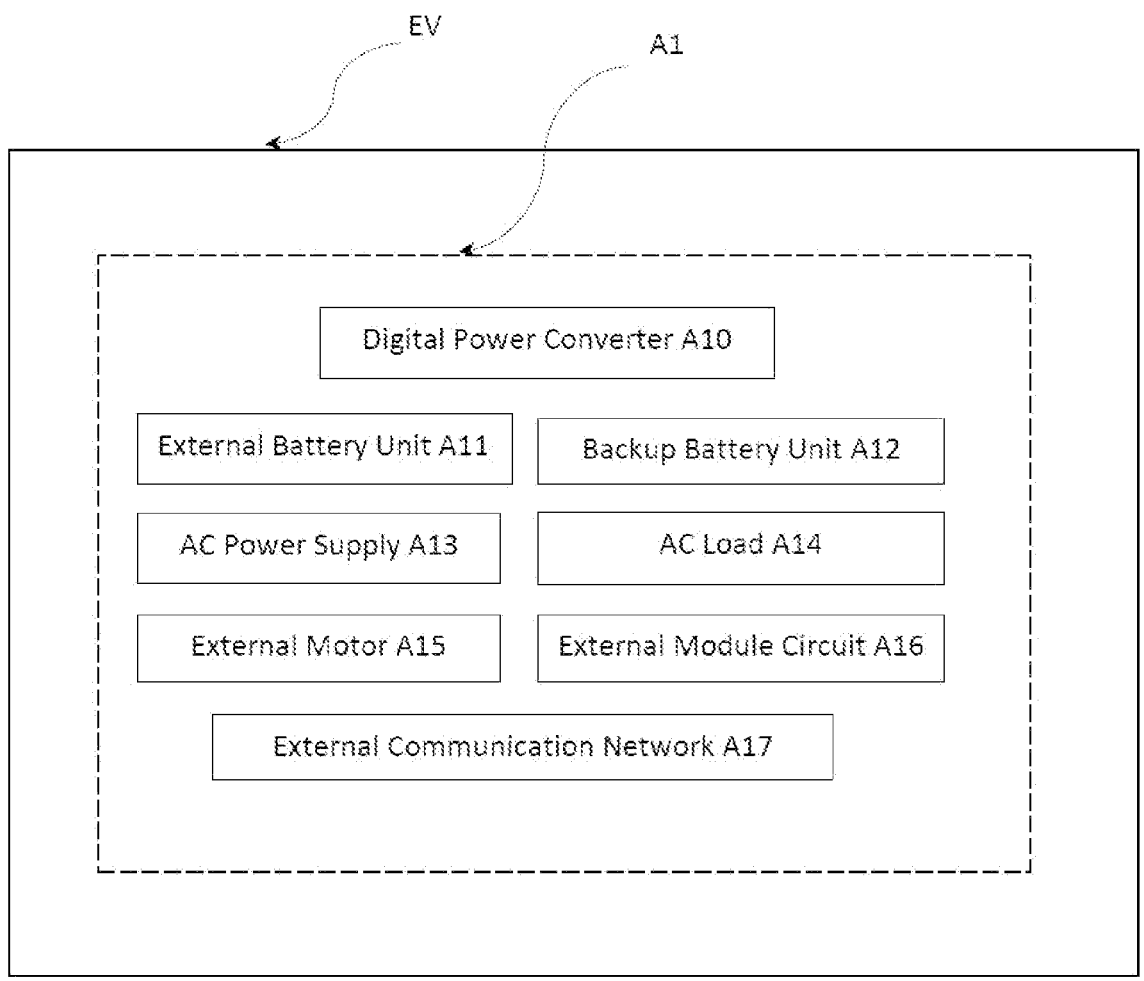
FIG. 1 is a block diagram of illustrating a digital power converter arrangement of an electric vehicle according to a preferred embodiment of the present invention.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Further, this description is not to be considered as limiting the scope of the embodiments described herein in any way, but rather as merely describing implementation of the one or more embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, tablet, personal data assistant, or mobile device. Program code is applied to input data to perform the functions described herein and to generate output information. The output information is applied to one or more output devices. In some embodiments, the communication interface may be a network communication interface. In some embodiments in which elements of the invention are combined, the communication interface may be a software communication interface, such as those for inter-process communication (IPC). In some embodiment, there may be a combination of communication interfaces.

Figure 2:
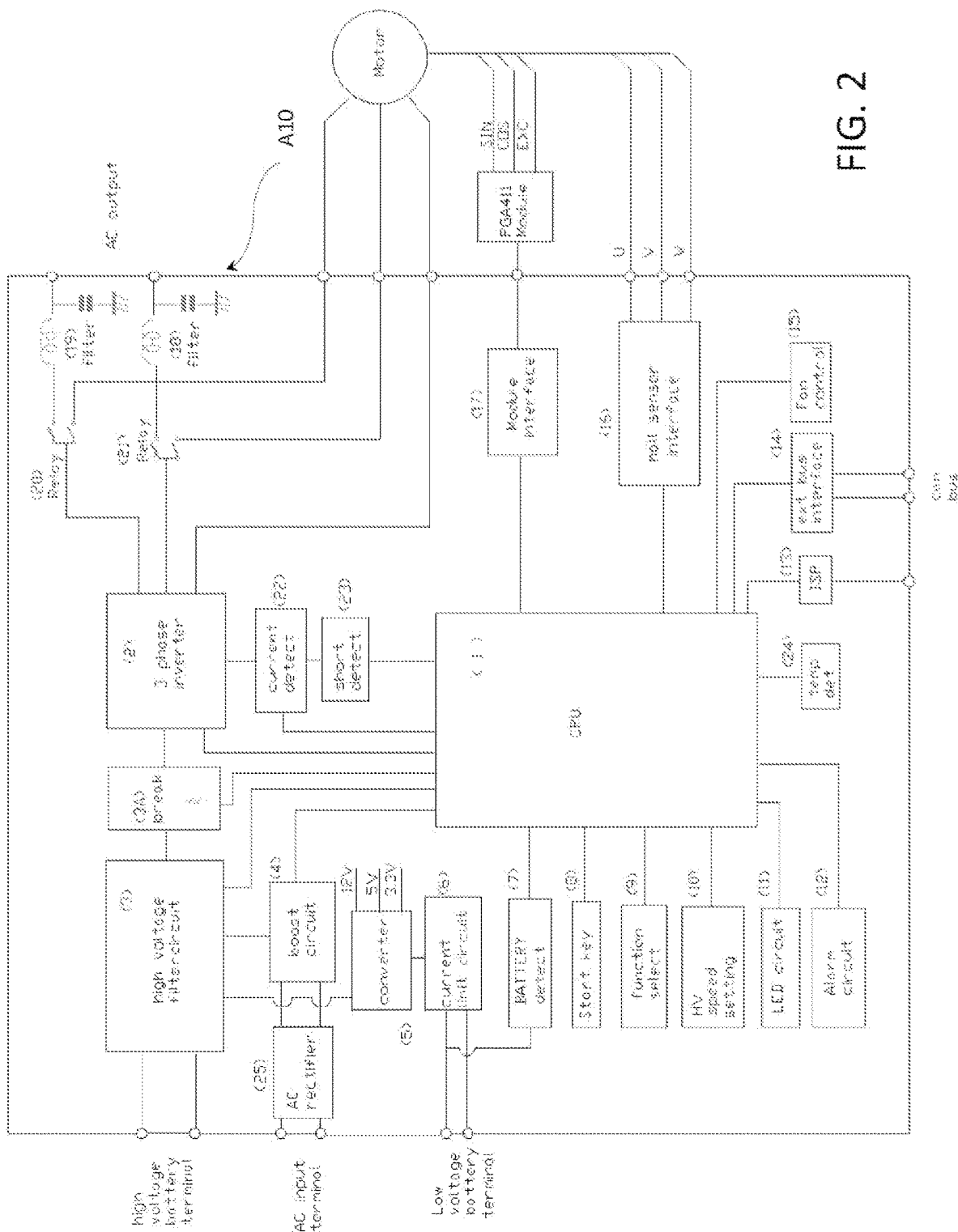
FIG. 2 is a block diagram of the digital power converter of the electric vehicle according to a preferred embodiment of the present invention.

Referring to FIG. 1 and FIG. 2 of the drawing, a digital power converter arrangement A1 of an electric vehicle EV according to a preferred embodiment of the present invention is illustrated, wherein the digital power converter arrangement A1 includes a digital power converter A10 which includes a CPU circuit (Central Processing Unit) 1, a three-phase inverter circuit (3-phase inverter) 2, a high voltage filter circuit 3, a brake circuit (break) 3A, a voltage boost circuit (boost circuit) 4, a high voltage to low voltage converter circuit (converter) 5, a current limit circuit 6, a backup battery voltage detection circuit (battery detect) 7, a power switch circuit (start key) 8, a function selection circuit (function select) 9, a high voltage and speed setting circuit (HV speed setting) 10, a LED circuit 11, an alarm circuit 12, an ISP circuit 13, an external communication network interface circuit (EXT bus interface) 14, a fan control circuit 15, a hall sensor interface circuit 16, an external module interface circuit (module interface) 17, a filter circuit including a first filter 18 and a second filter 19, an output switching circuit including a first relay 20 and a second relay 21, an output current detection circuit (current detect) 22, an output short-circuit currently detection circuit (short detect) 23, a temperature detection circuit (temp det) 24, and an AC rectifier circuit (AC rectifier) 25, as shown in FIG. 2.

The digital power converter arrangement A1 further includes external components including, but not limited to, at least one external battery unit A11, at least one backup battery unit A12, at least one AC power supply A13, at least one AC load A14, at least one external motor A15, at least one external module circuit A16, and at least one external communication network A17 equipped in the electric vehicle EV, as illustrated in FIG. 1.

The at least one external battery unit A11 can be the power battery set of the electric vehicle EV that generally comprises a plurality of lithium batteries each having a battery voltage higher than the voltage of the at least one AC power supply A13. The at least one backup battery unit A12 comprises one or more low-voltage batteries which may usually be lead-acid batteries. The at least one AC load A14 can be electrical appliance, device, equipment, and the like installed in the electric vehicle EV using alternate current (AC) power. The at least one external motor A15 refers to, but not limited to, the three-phase AC motor generally equipped in the electric vehicle EV such as brushed motor and three-phase brushless motor. The at least one external module circuit A16 is implemented as a resolver decoding circuit configured for decoding the output signals of the resolver equipped in the electric vehicle EV, that rotates synchronously with the motor. The at least one external communication network A17 can be a standard communication network to be communicated with the electric vehicle EV, such as CAN bus embodied in the preferred embodiment or other network likes such LIN, 5G, and etc.

It is worth mentioning that the electric vehicle EV is a vehicle that uses one or more electric motors for propulsion that can be powered by a collector system, with electricity from extravehicular sources, e.g. charged by solar panels or by converting fuel to electricity using fuel cells or a generator. Electric vehicle can be, but not limited to, ground vehicle such as road and rail pure-electric or hybrid vehicle, water surface and underwater vessel such as electric boat, motorboat, sailboat, and submarine, electric aircraft, and electric spacecraft.

Figure 3:
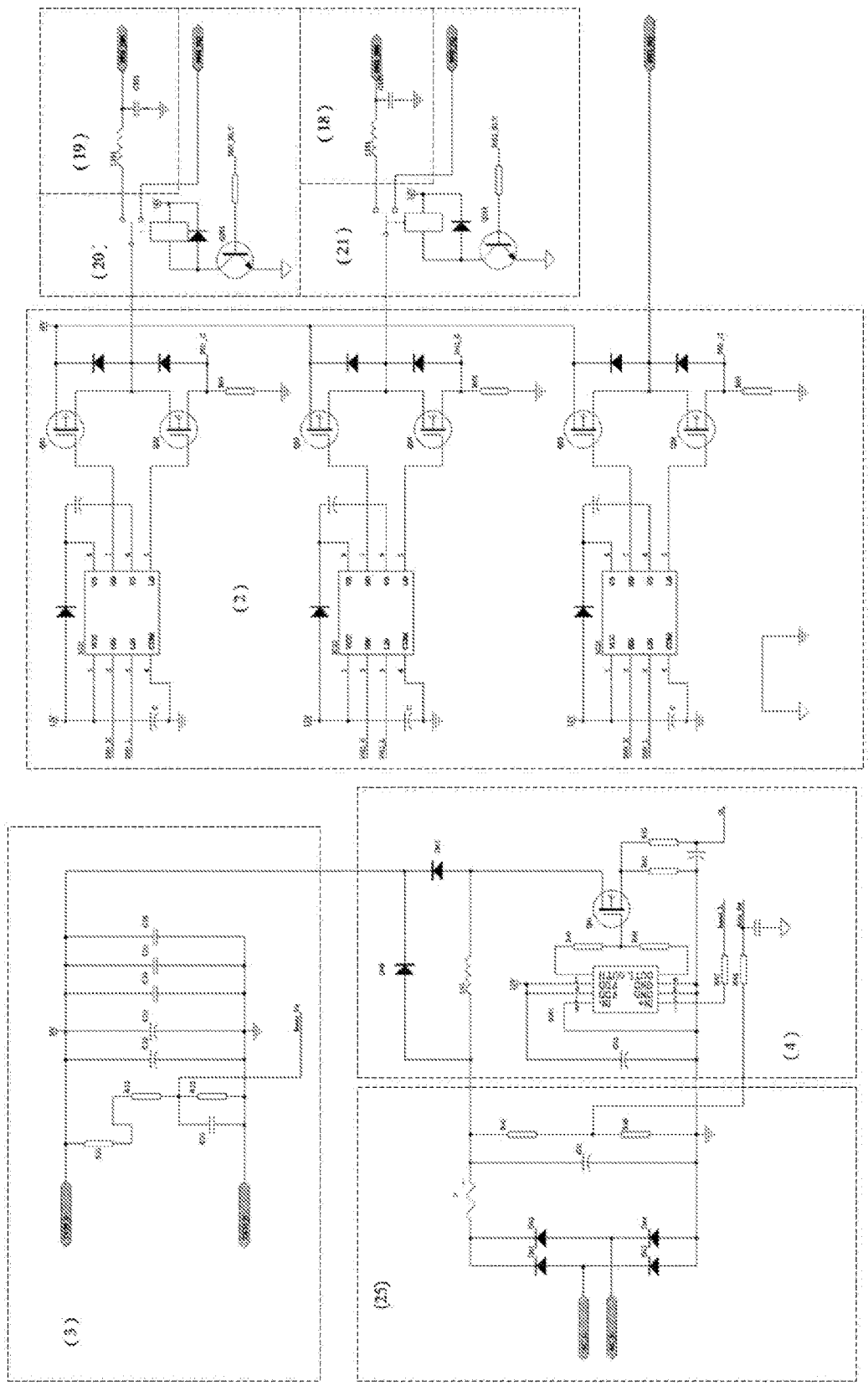
FIG. 3 is a circuit diagram illustrating the digital power converter of the electric vehicle according to the above preferred embodiment of the present invention.
Figure 5:
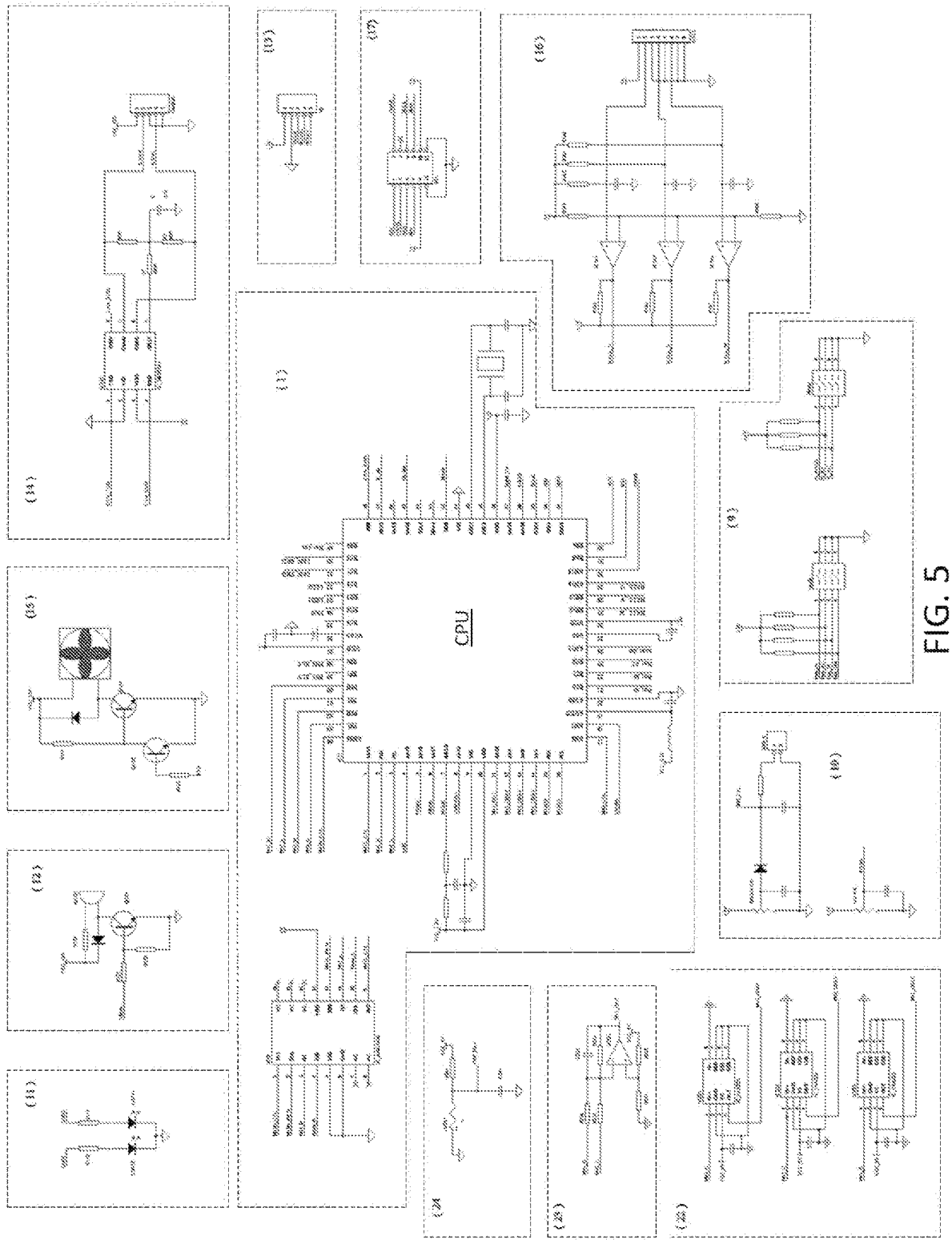
FIG. 5 is another circuit diagram illustrating the digital power converter of the electric vehicle according to the above preferred embodiment of the present invention.

Referring to FIG. 5, according to the preferred embodiment of the present invention, the CPU circuit 1 is configured to execute and perform analog and digital conversion (ADC), pulse-width modulation (PWM) and/or communication. Multiple PWM signals are outputted based on the PWM signals built-in a CPU (IC11) of the CPU circuit 1 by changing a time ratio of a turn-on/turn-off of square wave pulse width modulation signals to provide a driver signal function for the high voltage filter circuit 3 which is three-phase driving circuit and the voltage boost circuit 4 that is utilizing software to change the IO output state of the PWM signal, as shown in FIG. 3.

Regarding the ADC function, it is a process of converting analog voltages to digital data for providing an ability of current detection, according to the preferred embodiment, including steps of:
extracting three-phase current data through the output current detection circuit 22;
extracting battery terminal data via the backup battery voltage detection circuit 7;
detecting voltage and current data of one or more input terminals of the AC rectifier circuit 25;
detecting voltage data of one or more high voltage batteries through the high voltage filter circuit 3; and
detecting motor speed control data of one or more motors through the high voltage and speed setting circuit 10.

Regarding the multiple communication functions, according to the preferred embodiment, it includes steps of:
communicatively linking an external application module PGA411 through the external module interface circuit 17 based on the SPI communication standard; and
communicatively linking an external CAN bus through the external communication network interface circuit 14 based on the CAN bus communication standard.

Figure 6:
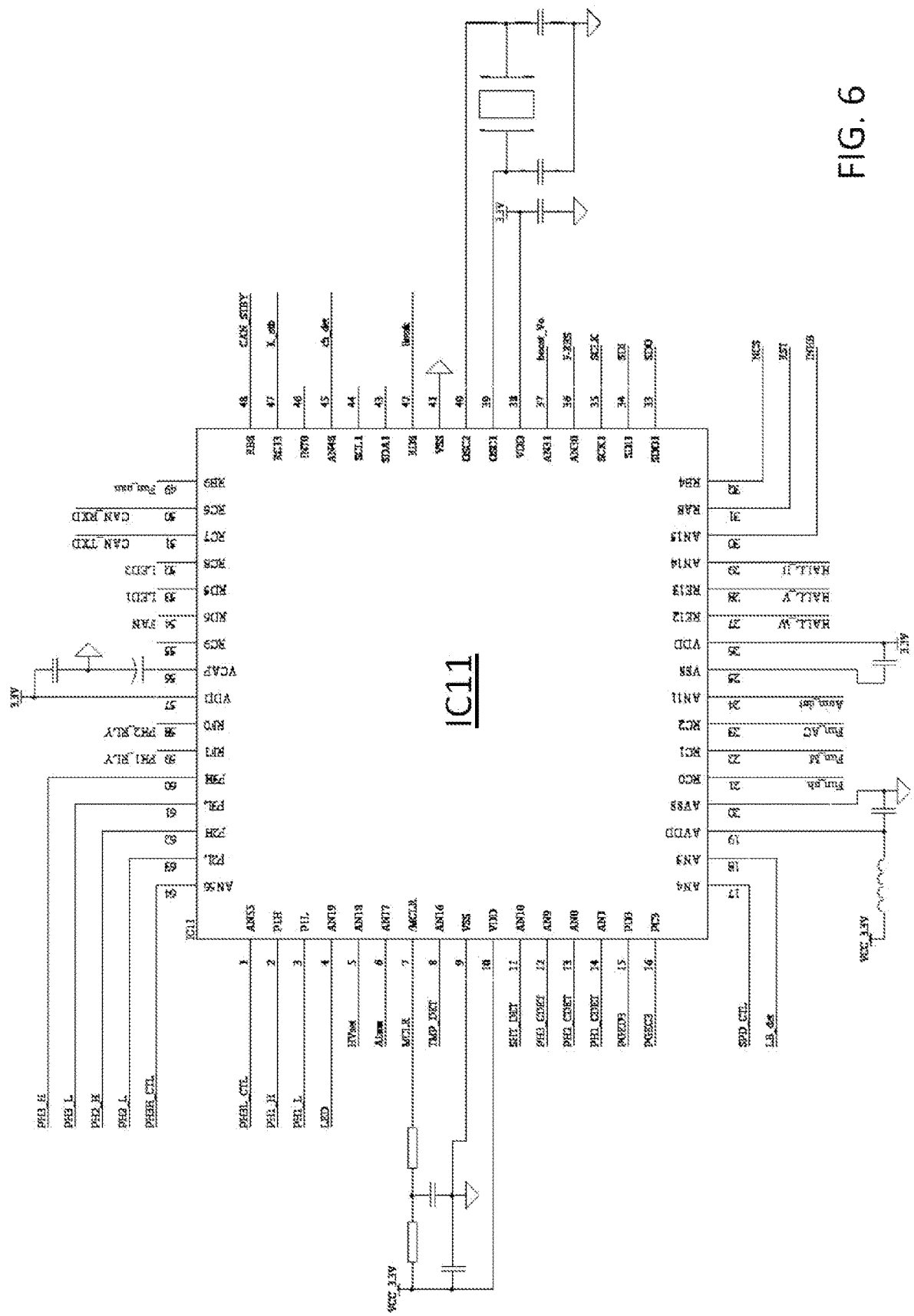
FIG. 6 is a circuit diagram illustrating the CPU of the CPU circuit of the digital power converter of the electric vehicle according to the above preferred embodiment.
Figure 7:
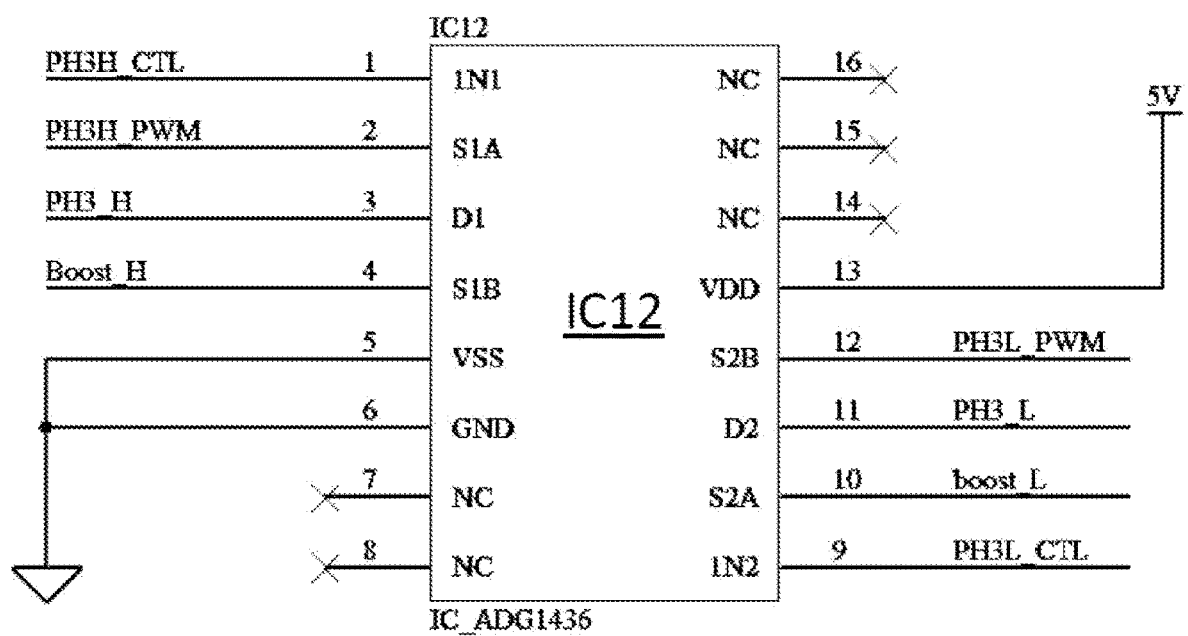
FIG. 7 is a circuit diagram illustrating the IC of the CPU circuit of the digital power converter of the electric vehicle according to the above preferred embodiment.

Referring to FIG. 5 to FIG. 7, the CPU circuit 1 includes a CPU (IC11) and an integrated circuit (IC12) which is signal switching IC that can select PH3_L signal to communicatively link with the three-phase inverter circuit 2 or the voltage boost circuit 4.

Figure 4:
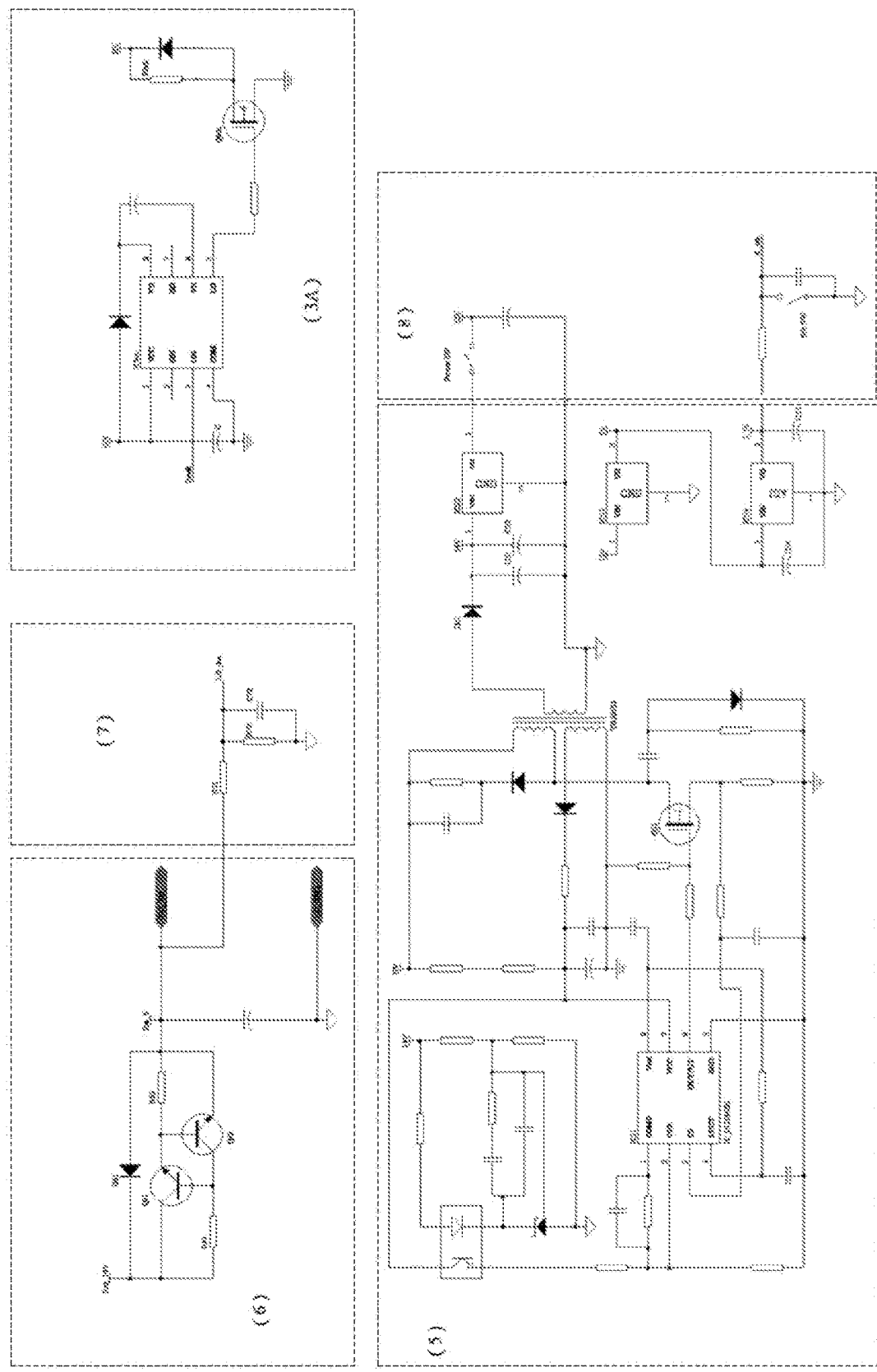
FIG. 4 is a circuit diagram illustrating the digital power converter of the electric vehicle according to the above preferred embodiment of the present invention.
Figure 8:
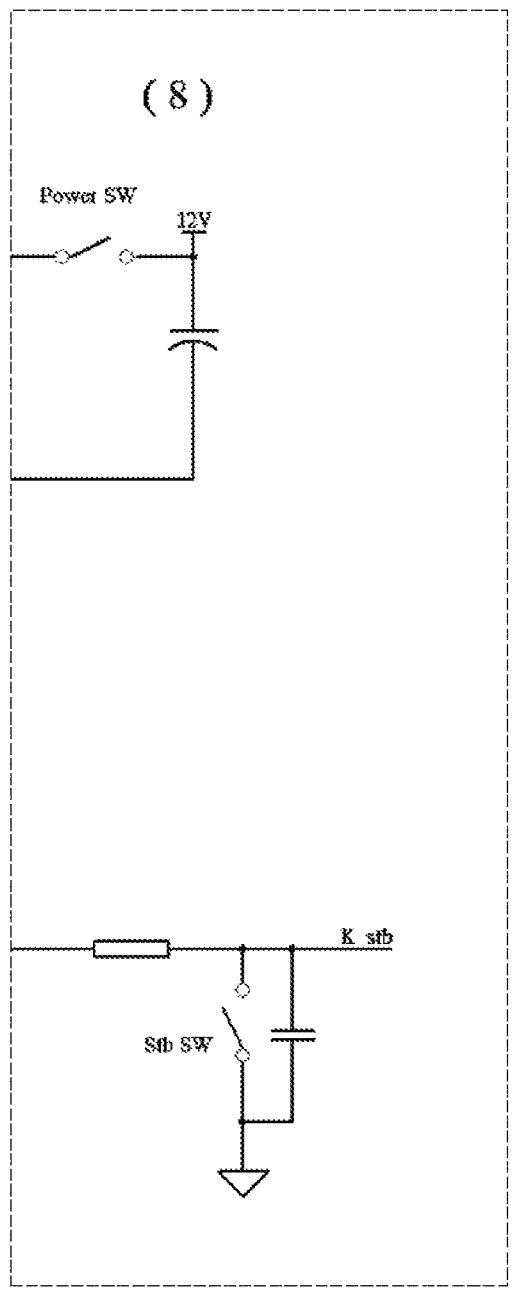
FIG. 8 is a circuit diagram illustrating the power switch circuit of the digital power converter of the electric vehicle according to the above preferred embodiment.

Referring to FIG. 4 and FIG. 8, the power switch circuit 8 includes a first switch (Power SW) and a second switch (Stb SW). The first switch (Power SW) is a main power switch configured to disconnect the 12V power source after the Power SW is switched off so as to render the digital power converter A10 in a shutdown state. The second switch (Stb SW) is configured to allow the CPU (IC11) entering a standby state after the second switch (Stb SW) is switched off so as to activate the digital power converter A10 via the CAN bus.

Figure 13:
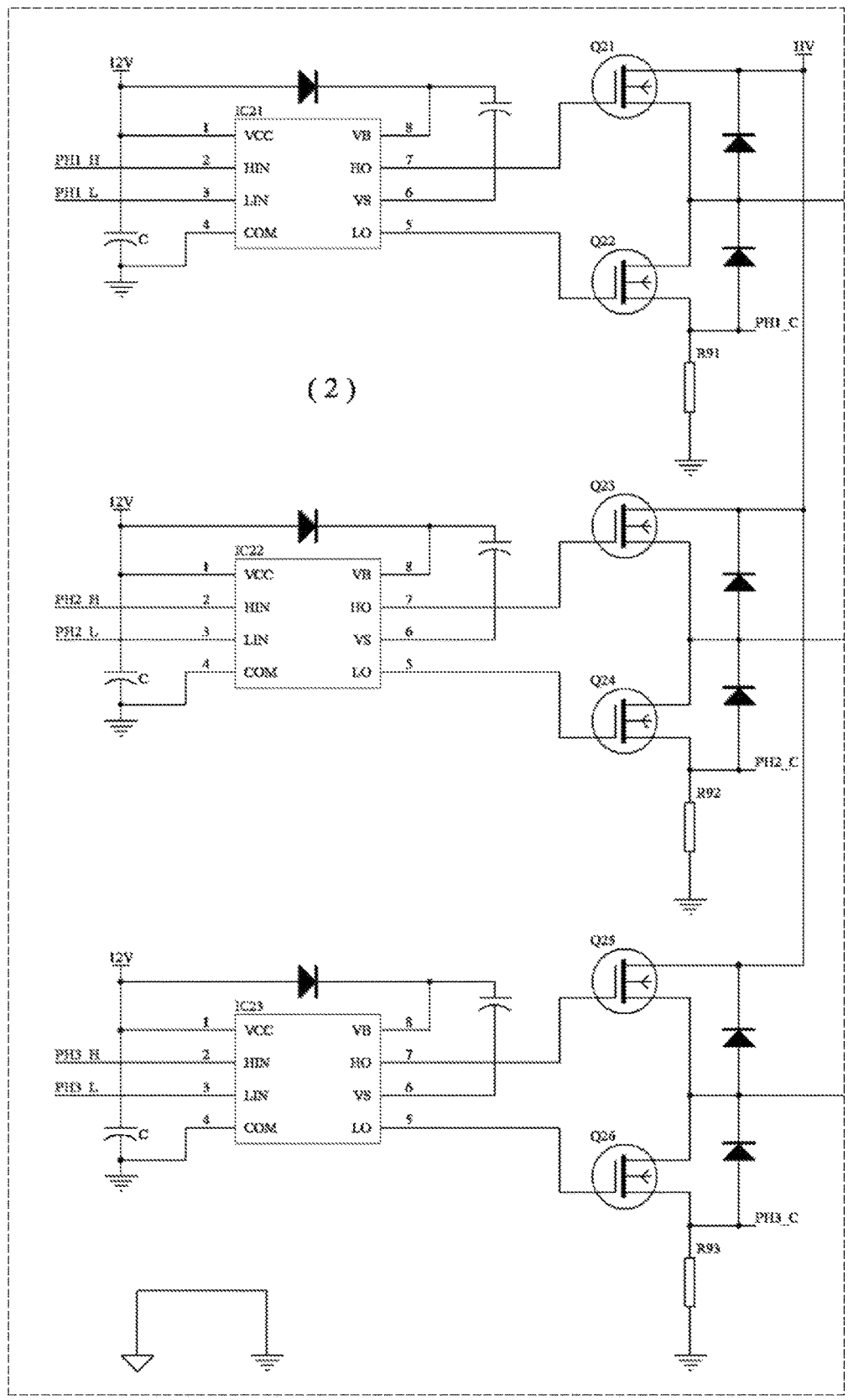
FIG. 13 is a circuit diagram illustrating the three-phase inverter circuit of the digital power converter of the electric vehicle according to the above preferred embodiment.

Referring to FIG. 3 and FIG. 13, the three-phase inverter circuit 2 can be implemented as a conventional inverter as disclosed in U.S. Pat. No. 6,646,849 invented by the inventor of the present invention. According to the preferred embodiment of the present invention, an innovative digital power inverter, as disclosed in the U.S. patent application Ser. No. 17/750,298 invented by the inventor of the present invention, is implemented as the three-phase inverter circuit 2 as shown in FIG. 13. The three-phase inverter circuit 2 is configured to expand power conversion into a three-phase AC output with three-phase motor driving capability integrated with artificial intelligence so as to fulfill a three-phase power supply demand and to meet the power demand of three-phase load or three-phase motor drive. The three-phase inverter circuit 2 provides digital power supply with the CPU (IC11) as the control core to quantitatively analyze and process the input and output information and to automatically make corresponding adjustments to the input and output. In addition, the three-phase inverter circuit 2 can process a transmission of various digital information so as to be intercommunicated and interconnected with other digital device, so as to achieve a human-computer interaction, that is a user interface where interactions between humans and the electric vehicle occur to allow effective operation and control of the electric vehicle from humans end, while the electric vehicle simultaneously feeds back information that aids the human decision-making process for operation of the electric vehicle.

The three-phase inverter circuit 2 as shown in FIG. 13 is a high voltage driving circuit including an AC driving circuit and an inverting circuit, wherein the AC driving circuit has an integrated circuit configuration comprised of integrated circuits IC21, IC22, IC23 and the inverting circuit includes a three-phase half bridge circuit including four PWM half-bridge chips configured to output three-phase power through four power bridge outputs, such as filed-effect transistors (Metal-Oxide-Semiconductor Field-Effect Transistor) Q21, Q22, Q23, Q24 or IGBT (Insulated-Gate Bipolar Transistor) bridge outputs, or alternatively to output any two-phase power to obtain a single-phase power output, wherein it can be determined by the output signal of the CPU (IC11).

Figure 9:
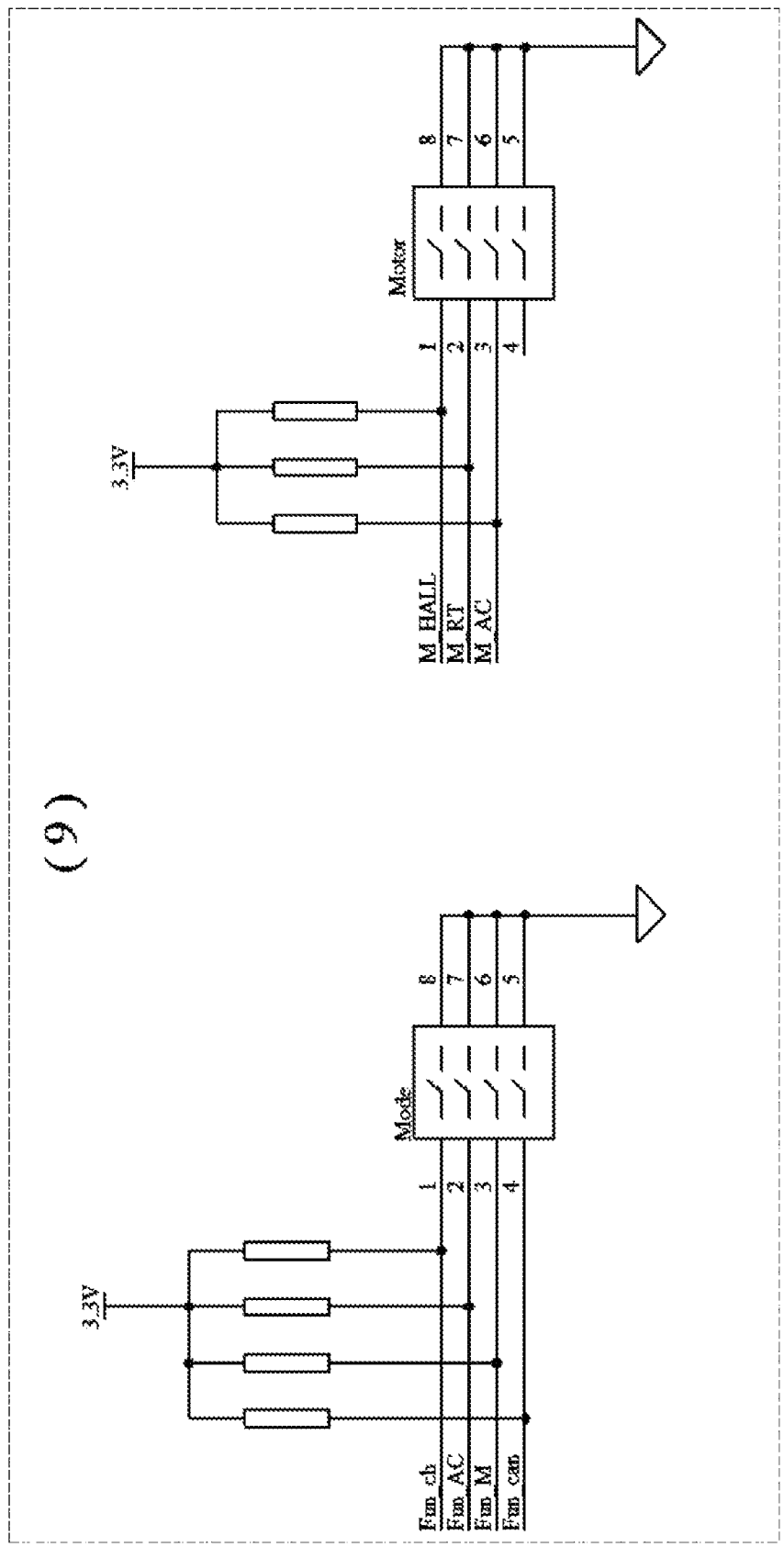
FIG. 9 is a circuit diagram illustrating the function selection circuit of the digital power converter of the electric vehicle according to the above preferred embodiment.

Referring to FIG. 5 and FIG. 9, the function selection circuit 9 includes a function selector switch (Mode) and a motor selector switch (Motor), wherein the function selector switch (Mode) may select an external battery charging function mode (Fun_ch), an AC power supply output function mode (Fun_AC), an external motor driver function mode (Fun_M), and an input control instruction function mode via an external network (Fun-can), wherein the motor selector switch (Motor) only functions M_HALL mode when the external motor driver function mode (Fun_M) is selected, and that the selection of the external motor requires the external module circuit providing a type of feedback message M_AC while the external motor does not provide such type of feedback message. The CPU (IC11) detects the function selector switch (Mode) and the motor selector switch (Mode) to switch states to run the corresponding functions.

Figure 10:
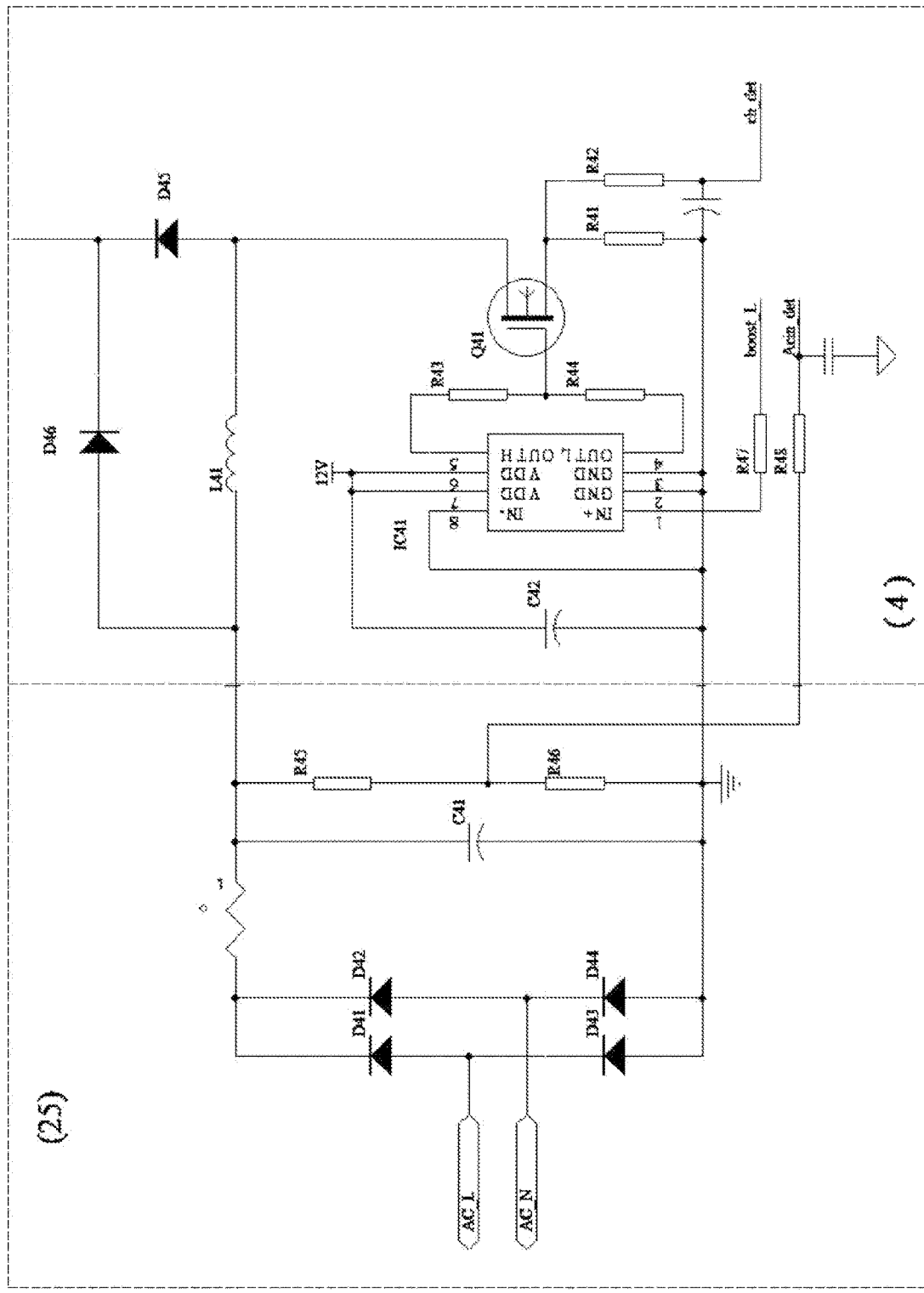
FIG. 10 is a circuit diagram illustrating the AC rectifier circuit and the voltage boost circuit of the digital power converter of the electric vehicle according to the above preferred embodiment.
Figure 11:
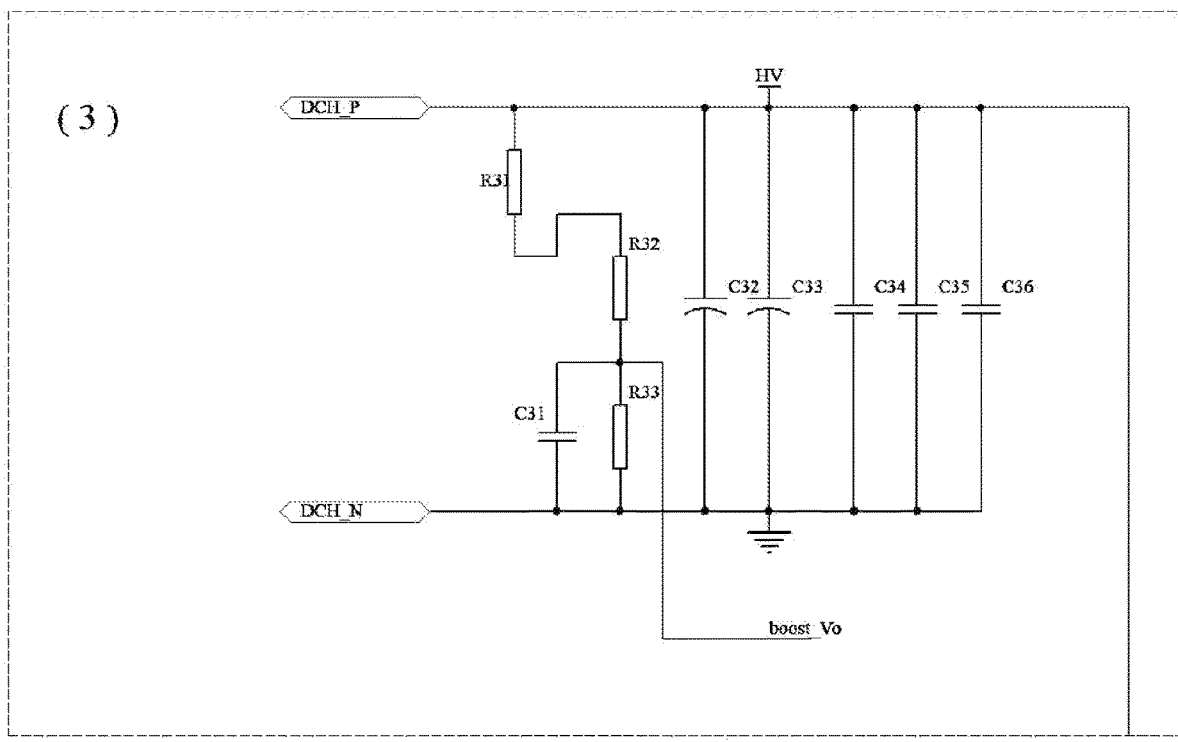
FIG. 11 is a circuit diagram illustrating the high voltage filter circuit of the digital power converter of the electric vehicle according to the above preferred embodiment.

As shown in FIG. 5, when the function selector switch (Mode) selects the external battery charging function (Fun-Ch), the CPU (IC11) operates in a charging mode, wherein, as shown in FIG. 3, FIG. 10 and FIG. 11, external AC power is supplied via the terminals AC_N and AC_L of the AC rectifier circuit 25. Then, the external AC current is rectified through diodes D41, D42, D43, D44 to obtain a DC voltage at both terminals of a capacitor C4, wherein the DC voltage is raised by the voltage boost circuit 4 and then feeds to buffer capacitors C32, C33 of the high voltage filter circuit 3, as shown in FIG. 11, to filter out the pulsating voltage for charging external battery through the battery terminals DCH_P, DCH_N.

Referring to FIG. 10, the DC voltage presented at a drain terminal of a field-effect transistor Q41 through an inductor D41 of the voltage boost circuit 4 is in a turned off state due to a reverse voltage. An integrated circuit IC41 of the voltage boost circuit is a signal driving IC that after a boost driving signal is inputted via a connecting line (boost_L), the integrated circuit IC41 amplifies the boost driving signal to enable the filed-effect transistor Q41 to produce ON/OFF action corresponding to the PWM driving signal, wherein during ON state, electrical current flowing through the field-effect transistor Q41, the resistor R41 and capacitor C41 magnetizes the capacitor L41, and during OFF state, the inductor L41 releases electrical current and produces high voltage for positive electrical conduction therethrough, so that a high voltage and current is generated to feed to the high voltage filter circuit 3, as shown in FIG. 3 and FIG. 11, to stabilize the voltage and then to charge the external battery via the battery terminals DCH_P and DCH_N.

Referring to FIG. 3 and FIG. 11, the resistors R31, R32, R33, C31 are configured to form a voltage divider circuit to transmit the battery potential signal back to the CPU (IC11) through an electric line (boost_Vo). When the electrical conduction of the field-effect transistor Q41 is on, electrical current passes the divider resistor R41 and generates a voltage corresponding to the electrical current that is transmitted to the CPU (IC11) via an electric line (ch_det) to detect an electrical current value of battery charge according to the voltage, as shown in FIG. 3. Also, the resistors R45, R46 are configured to form a voltage divider circuit to provide a voltage corresponding to the DC voltage that is transmitted to the CPU (IC11) via the electric line (Acin_det), so that a charging voltage value, a charging current value, and a circuit input voltage value of the external battery is computed according to the above-mentioned three voltage values, and then a PWM signal parameter is computed for adjusting output PWM signals to complete the charging function.

Figure 12:
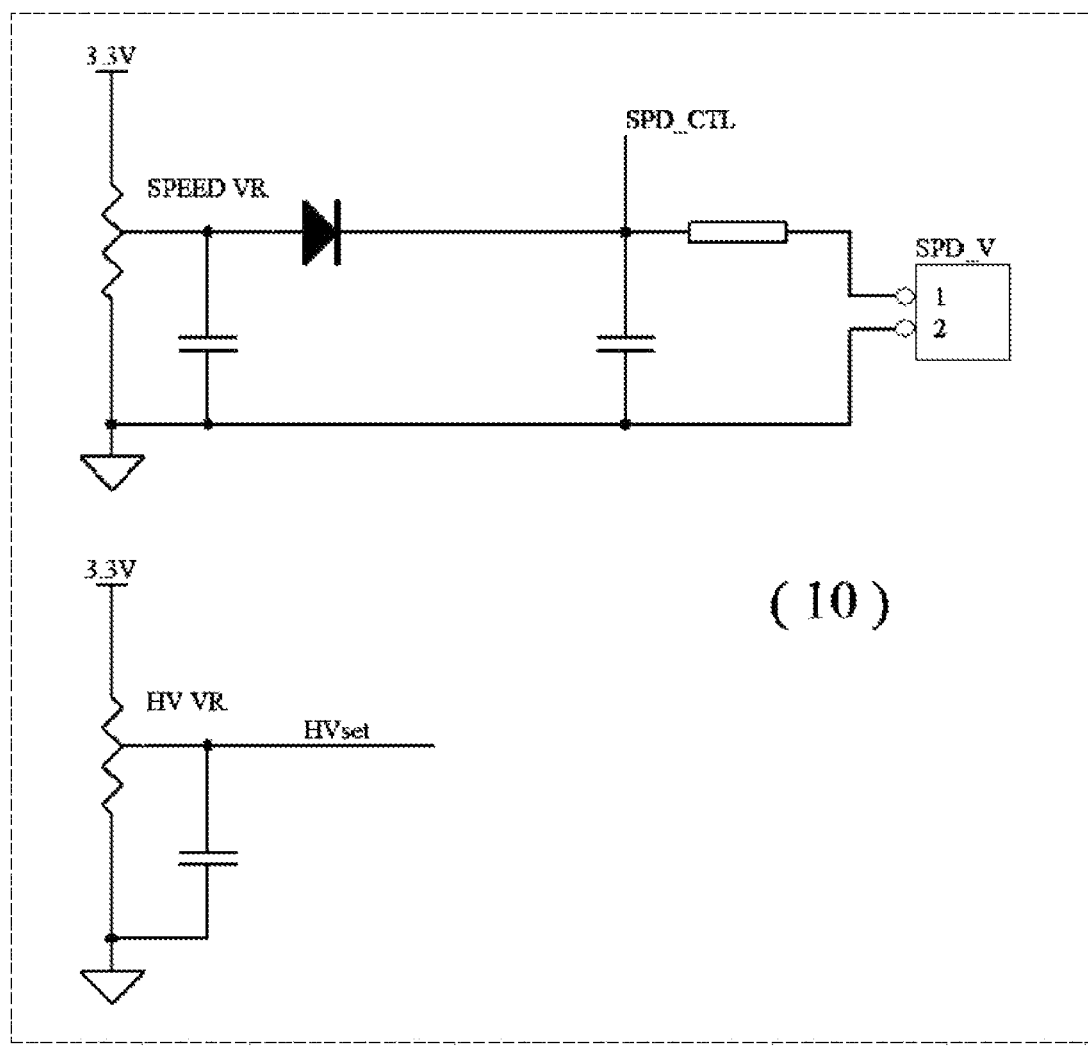
FIG. 12 is a circuit diagram illustrating the high voltage and speed setting circuit of the digital power converter of the electric vehicle according to the above preferred embodiment.

Referring to FIG. 5 and FIG. 12, the high voltage and speed setting circuit 10 is configured to provide an external motor operation speed setting function and an external motor voltage setting function, wherein by changing a rotation position point of an adjustable resistor (Speed VR) can output a motor rotating speed control voltage from a middle connection point of the adjustable resistor (Speed VR) to a connection line (SPD_CTL). At the same time, an external control voltage is presented at connection line (SPD_CTL) via the terminal port (SPD_V), and that the CPU (IC11) reads external motor rotating speed control information through the connection line (SPD_CTL) and outputs corresponding control signals. Similarly, an adjustable potentiometer (HV VR) outputs a voltage value corresponding to the high voltage (HV) of the high voltage filter circuit 3 as shown in FIG. 11. Since the high voltage (HV) is connected with the external battery through the battery terminals DCH-P, DCH_N, the voltage is equal to the external battery, so that the CPU (IC11) can determine the battery charging voltage by detecting the output voltage of the adjustable potentiometer (HV VR). According to the preferred embodiment, the external battery voltage is set as 250V, while the external battery voltage set by adjusting the adjustable potentiometer (HV VR) of the high voltage and speed setting circuit 10.

Referring to FIG. 5 and FIG. 9, when the function selector switch (Mode) is switched to select the AC power supply function mode (Fun_AC) that is a power source switching mode, the external battery inputs DC power through the high voltage filter circuit 3 and then switches into AC power supply through a three-phase driver to output, wherein the AC power supply raises its voltage by the voltage boost circuit 4 to supplement the power loss of the external battery.

Referring to FIG. 3, FIG. 5 and FIG. 6, the CPU(IC11) outputs a sine pulse-width modulation signal (SPWM) via connection lines PH1_H, PH1_L, PH2_H, PH2_L, that is a PWM signal that changes the turn on/off time ratio in a proportion of a sine wave, wherein the connection lines PH1_H, PH1_L drive MOSFET transistors Q21, Q22 of the three-phase inverter circuit 2, as shown in FIG. 3 and FIG. 13, through a driver IC (IC21) to form a half-bridge circuit. The SPWM signal is amplified and presented at a middle connection point of the first relay 20, as shown in FIG. 3, and then is transmitted to the second filter 19 of the filter circuit to filter out the high frequency portions through an inductive capacitor so that a phase sinusoidal alternate current is outputted at a first output terminal (PH1_SIN). Similarly, the connection lines PH2_H, PH2_L drive MOSFET transistors Q23, Q23 of the three-phase inverter circuit 2 through a driver IC (IC22), the second relay 21, the first filter 18 of the filter circuit to output another phase sinusoidal alternate current at a second output terminal (PH2_SIN). Then the first output terminal (PH1_SIN) and the second output terminal (PH2_SIN) are connected and the first and second output terminals are combined into a single-phase sinusoidal AC power supply.

Referring to FIG. 3 and FIG. 5, when the function selector switch (Mode) is selected the AC power supply function mode (Fun_AC), the CPU (IC11) controls the first and second output terminals (PH1_SIN, PH2_SIN) via IO pins (PH1_RLY, PH2_RLY) thereof and through triodes Q201, Q202 and the first relay 20 and the second relay 21 respectively. When the function selector switch (Mode) is switched to the external motor driver function mode (Fun_M), the CPU (IC11) outputs relay control signals via IO pins (PH1_RLY, PH2_RLY) thereof and through the triodes Q210, Q202 to drive the first and second relays 20, 21 and control first and second output terminals (PH1_SQ, PH2_SQ) of the first and second relays 20, 21 respectively, while outputs of the MOSFET transistors Q25, Q26 are directly connected to a third output terminal (PH3_SQ).

Figure 14:
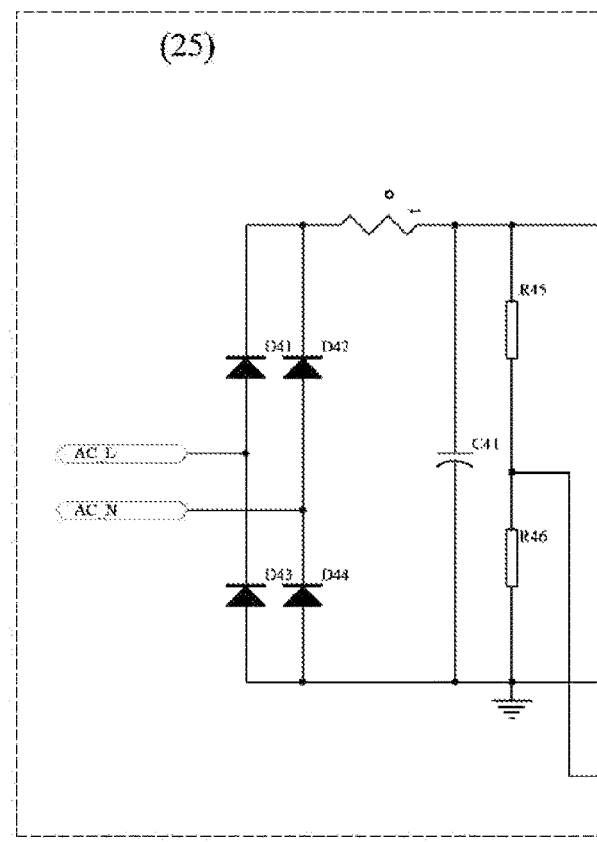
FIG. 14 is a circuit diagram illustrating the AC rectifier circuit of the digital power converter of the electric vehicle according to the above preferred embodiment.

Referring to FIG. 3, FIG. 6 and FIG. 14, the AC rectifier circuit 25 inputs AC power supply. The CPU (IC11) outputs the PWM signals via the connection lines (PH3_H, PH3_L) and through the signal switching IC (IC12) to switch to the voltage boost circuit 4 to raise an AC rectifier voltage to reach the external battery voltage potential so as to supplement the battery power consumption.

Referring to FIG. 3, FIG. 5, FIG. 9, and FIG. 12, when the function selector switch (Mode) of the function selection circuit 9 is switched to external motor driver function mode (Fun_M) that is an external motor driving mode, the high voltage filter circuit 3 is connected with the external battery via the terminals DCH_P, DCH_N to input DC power supply. The CPU (IC11) sets the driving voltage HV through the adjustable potentiometer (HV VR) and the rotating speed of the external motor through a circuit (SPEED VR). The CPU (IC11) outputs the PWM signals corresponding to the rotation angle of the external motor via connection lines PH1_H, PH1_L, PH2_H, PH2_L, PH3_H, PH3_L. The three-phase driving circuit, as shown in FIG. 3, including the driving ICs (IC21, IC22, IC23), drives the MOSFET transistors (Q21, Q22, Q23, Q24, Q25, Q26). The PWM signals drive the driving ICs (IC21, IC22, IC23) to drive the MOSFET transistors to generate ON/OFF state corresponding to the PWM signals, and drive the external motor to operate by switching to connect with motor three-phase output connection points (PH1_SQ, PH2_SQ and PH3_SQ) through the first and second relays 20, 21 respectively.

Referring to FIG. 5, FIG. 9 and FIG. 10, when the function selector switch (Mode) of the function selection circuit 9 is switched to the external motor driver mode (Fun_M), the AC power is rectified by the AC rectifier circuit 25 to output a DC voltage and feed into the high voltage filter circuit 3 via a bypass diode D41 to output steady direct current for motor operation. When the high voltage filter circuit 3 is connected to the external battery, the external battery provides power. If the external battery voltage is higher than the DC voltage, the bypass diode D41 is shut automatically due to reverse voltage.

Figure 15:
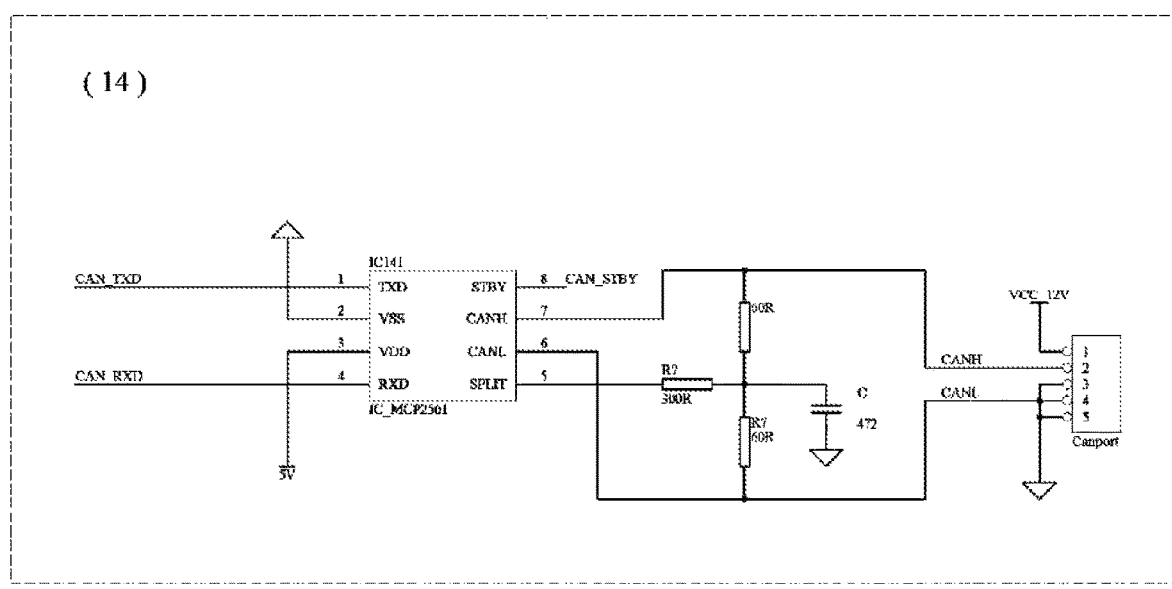
FIG. 15 is a circuit diagram illustrating the external communication network interface circuit of the digital power converter of the electric vehicle according to the above preferred embodiment.

Referring to FIG. 5 and FIG. 15, when the function selector switch (Mode) of the function selection circuit 9 is switched to the input control instruction function mode (Fun_can), the CAN port of the CIP (IC11) executes a communication operation mode, wherein when the power source is under a "STANDBY" status, an external device is able to transmit control signals and instructions via a CAN bus communication network through the external communication network interface circuit 14 which includes a communication interface IC (IC141) configured to input the control signals and instructions and transmit to the CPU (IC11) via the connection lines (Can_TXD, Can_RXD). The CPU (IC11) is built-in with a communication module to decode the CAN bus inputted information and read the control signals and instructions so as to execute all functions of the digital converter of the electric vehicle according to the control signals and instructions.

The function selector switch (Mode) selects Fun_can in this example when the mode selector switches in this example can port communication operation mode: When the power supply is in the Stand by state, the external device transmits control messages and instructions through the Can BUS communication network through a Can bus interface (14) circuit, wherein the Canport port is input to the communication interface IC (IC141) and then through the connection Can_TXD, Can_RXD, transmitted to the CPU (IC11) and through the built-in communication module on the Can BUS input message to read the control information and instructions, and according to the control message and instructions to perform all functions of the electric vehicle digital power converter Referring to FIG. 4, regarding the brake circuit 3A, when the external motor generates an induced voltage due to inertial operation, it will cause the driving voltage HV abnormal. The CPU (IC11) detects an abnormal voltage through a connection line (boost Vo), a signal is outputted via a connection line (break) to a driving IC (ICbrk) to turn a power element (Qbrk) on, so as to allow an induced voltage to be ground through a resistor (Rbrk) and the power element (Qbrk) to stabilize the driving voltage.

Figure 16:
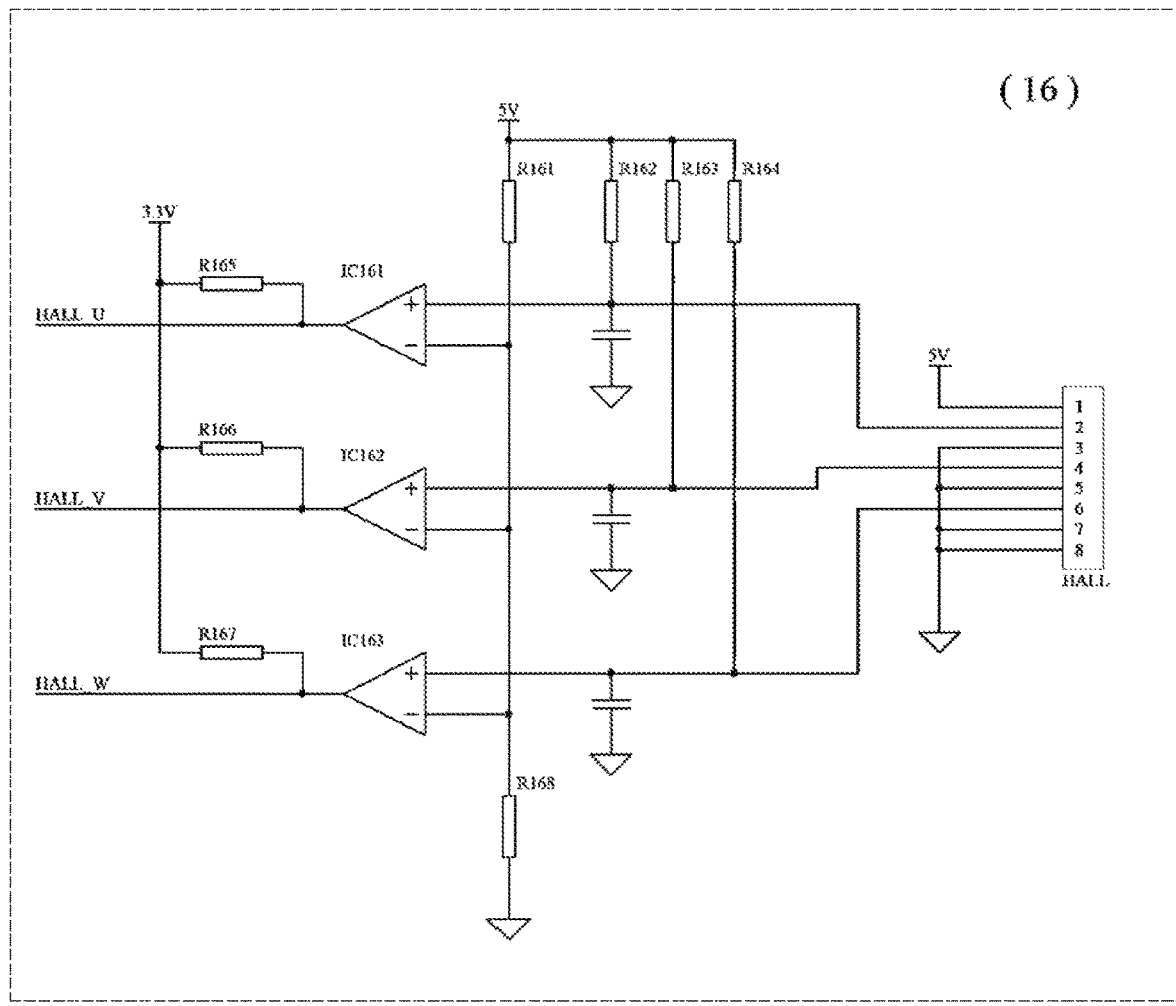
FIG. 16 is a circuit diagram illustrating the hall sensor interface circuit of the digital power converter of the electric vehicle according to the above preferred embodiment.

When the motor selector switch (Motor) of the function selection circuit 9 as shown in FIG. 9 is switched to a motor hall mode (M_HALL), a rotation angle feedback information based on a selection of the three-phase brushless motor is provided from the hall sensor interface circuit 16. Referring to FIG. 5 and FIG. 16, the hall sensor interface circuit 16 includes three operational amplifiers (OP amp) IC161, IC162, IC163 configured to filter out noise from three-phase (U, V, W) hall sensor signals inputted and then reform to square wave to output via the lines (HALL_U, HALL_V, HALL_W), wherein resistors (R161, R168) are configured to divide voltage potential for providing a trigger voltage potential that the input signal at the input terminal thereof is a low voltage potential which is lower than the trigger voltage potential, and the output signal at the output terminal thereof is a high voltage potential which is higher than the trigger voltage potential, such that the CPU (IC11) is able to determine the rotation angle of the motor according to the signal states via the connection lines (HALL_U, HALL_V, HALL_W) for processing a computation of PWM signal parameters to correct the output PWM signal parameters to ensure the motor running smoothly.

Figure 17:
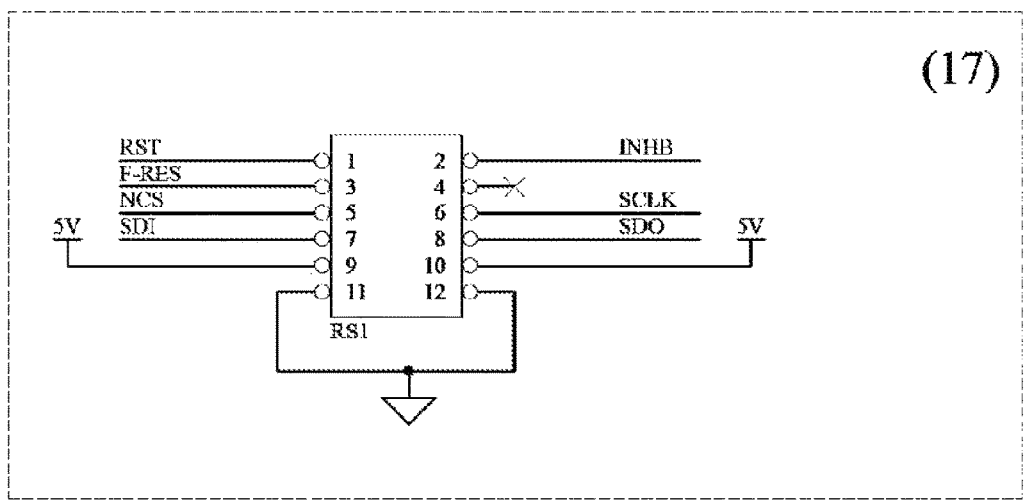
FIG. 17 is a circuit diagram illustrating the external module interface circuit of the digital power converter of the electric vehicle according to the above preferred embodiment.

Referring to FIG. 5, FIG. 9 and FIG. 17, when the motor selector switch (Motor) of the function selection circuit 9 is switched to a motor feedback mode (M_RT), a rotation angle feedback information is provided based on a rotary transformer of the external motor, wherein the feedback information requires the external module interface circuit 17 to decode the angular motor information. The CPU (IC11) controls an external module through the external module interface circuit 17 which includes an external module terminal, wherein the CPU (IC11) is able to connect with a decoding module of the rotary transformer of the external module through the external module terminal, and that the CPU (IC11) is linked with the external module through a built-in SPI communication module via the connection lines (SCLK, SDO, SDI) for information exchange, via the connection lines (RST, F-RES, NCS<INHB) for control status information exchange, and for providing a 5V power source.

Figure 18:
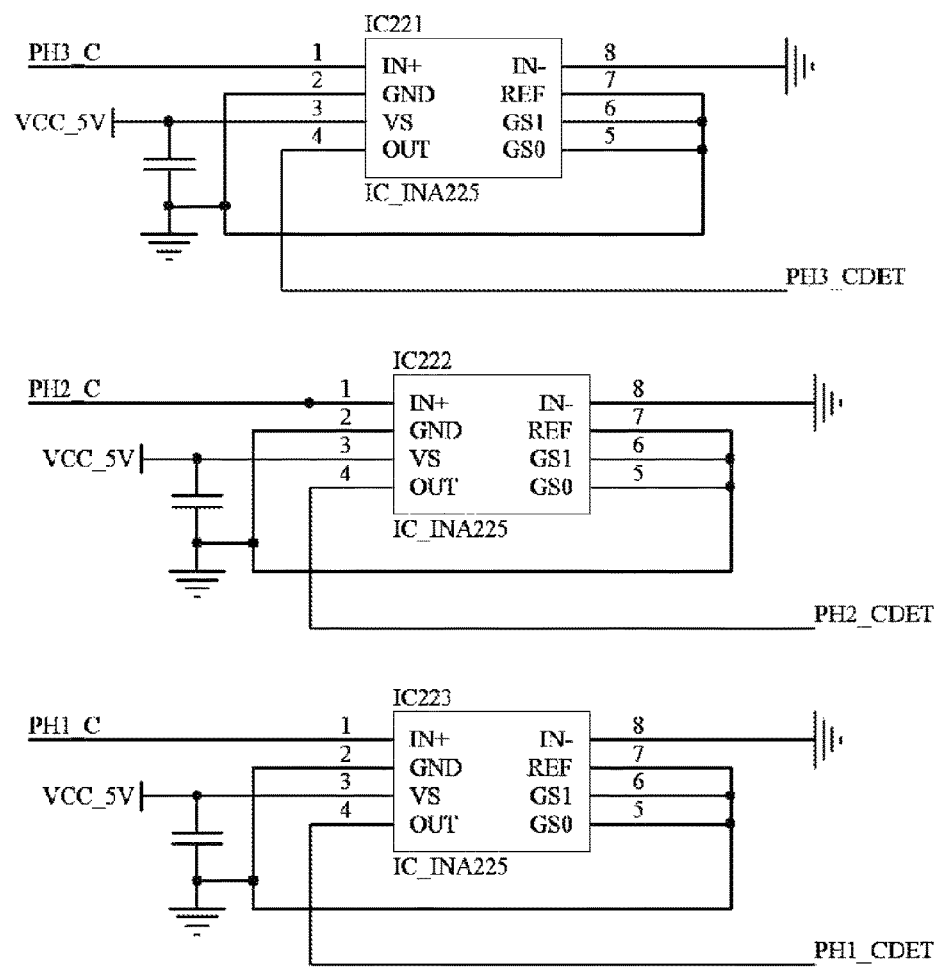
FIG. 18 is a circuit diagram illustrating the output current detection circuit of the digital power converter of the electric vehicle according to the above preferred embodiment.

Referring to FIG. 5 and FIG. 18, when the motor selector switch (Motor) of the function selection circuit 9 is switched to a motor AC mode (M_AC), a motor based on no rotation angle feedback is selected. The CPU (IC11) detects the motor current phase information through the output current detection circuit 22 for processing a computation of PWM signal parameters to correct the output PWM signal parameters to ensure the motor running smoothly.

Figure 19:
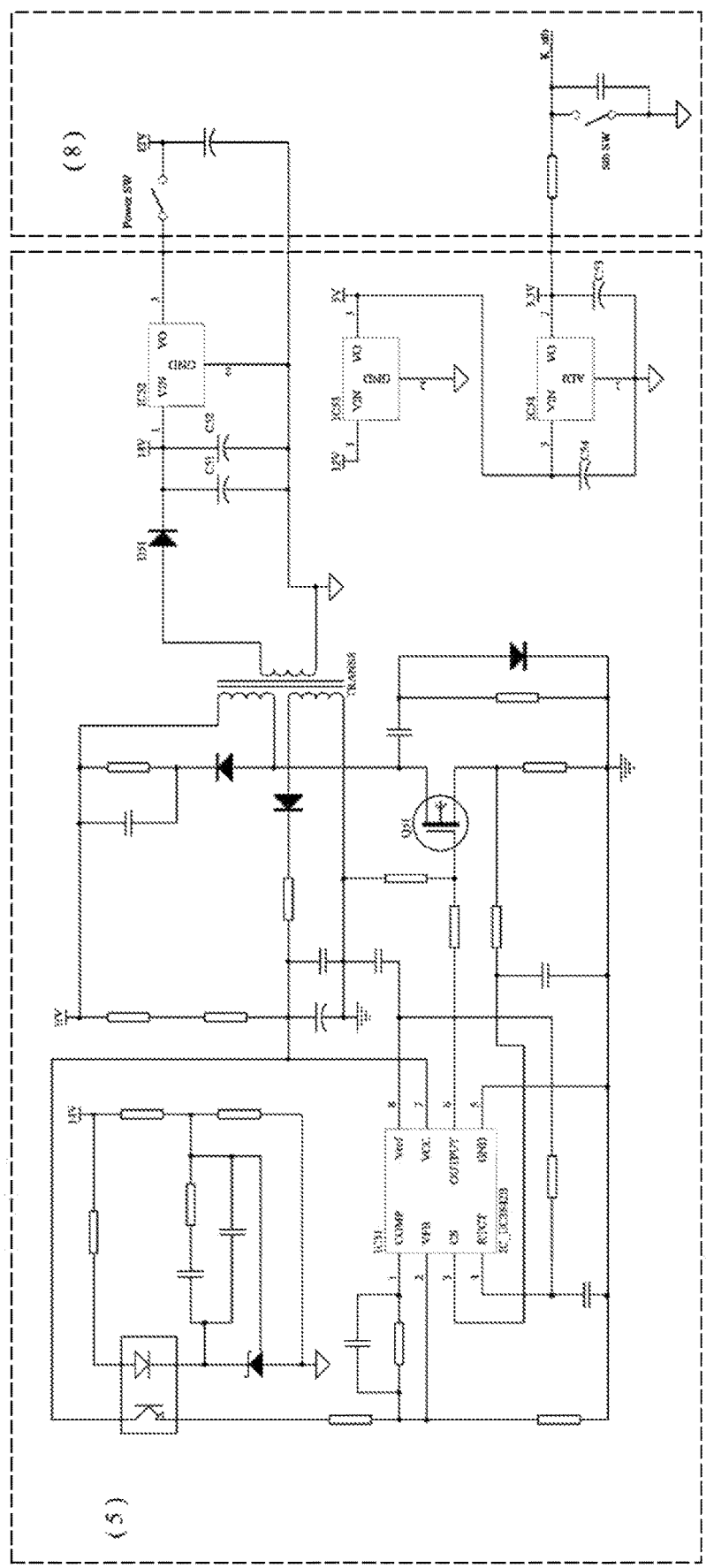
FIG. 19 is a circuit diagram illustrating the high voltage to low voltage converter circuit and the power switch circuit of the digital power converter of the electric vehicle according to the above preferred embodiment.

Referring to FIG. 4 and FIG. 19, the high voltage to low voltage converter circuit 5 is an independent circuit having a main function of providing power source for the CPU (IC11) and other ICs that require low voltage circuitry operation and charging power source for low voltage backup batteries.

Referring to FIG. 4, the high voltage to low voltage converter circuit 5 includes an integrated circuit IC51 which is power conversion IC configured to automatically generate PWM signals to drive high-power components, a transformer (TRANS8) having a primary winding connecting to a high voltage HV and a secondary winding connecting to a MOSFE emitter D, and a field-effect transistor Q51 having a gate terminal receiving PWM signals from the integrated circuit IC51, wherein a source terminal and a drain terminal of the field-effect transistor Q51 produce an ON/OFF effect therebetween and generate pulse voltage to the transformer T51 connected thereto. The primary winding voltage has a square wave AC state enabling the secondary winding outputs a low-voltage AC output through a diode D51 and capacitors C51, C52 to form a 14V DC voltage power source after rectifying and filtering, wherein the 14V DC voltage power source is able to output a steady 12V voltage through a voltage regulation IC (IC52). When a power switch (Power SW) is in ON state, the 12V voltage provides 5V and 3.3V voltages through the voltage regulation IC (IC52) for the arrangement to operate respectively.

Figure 20:
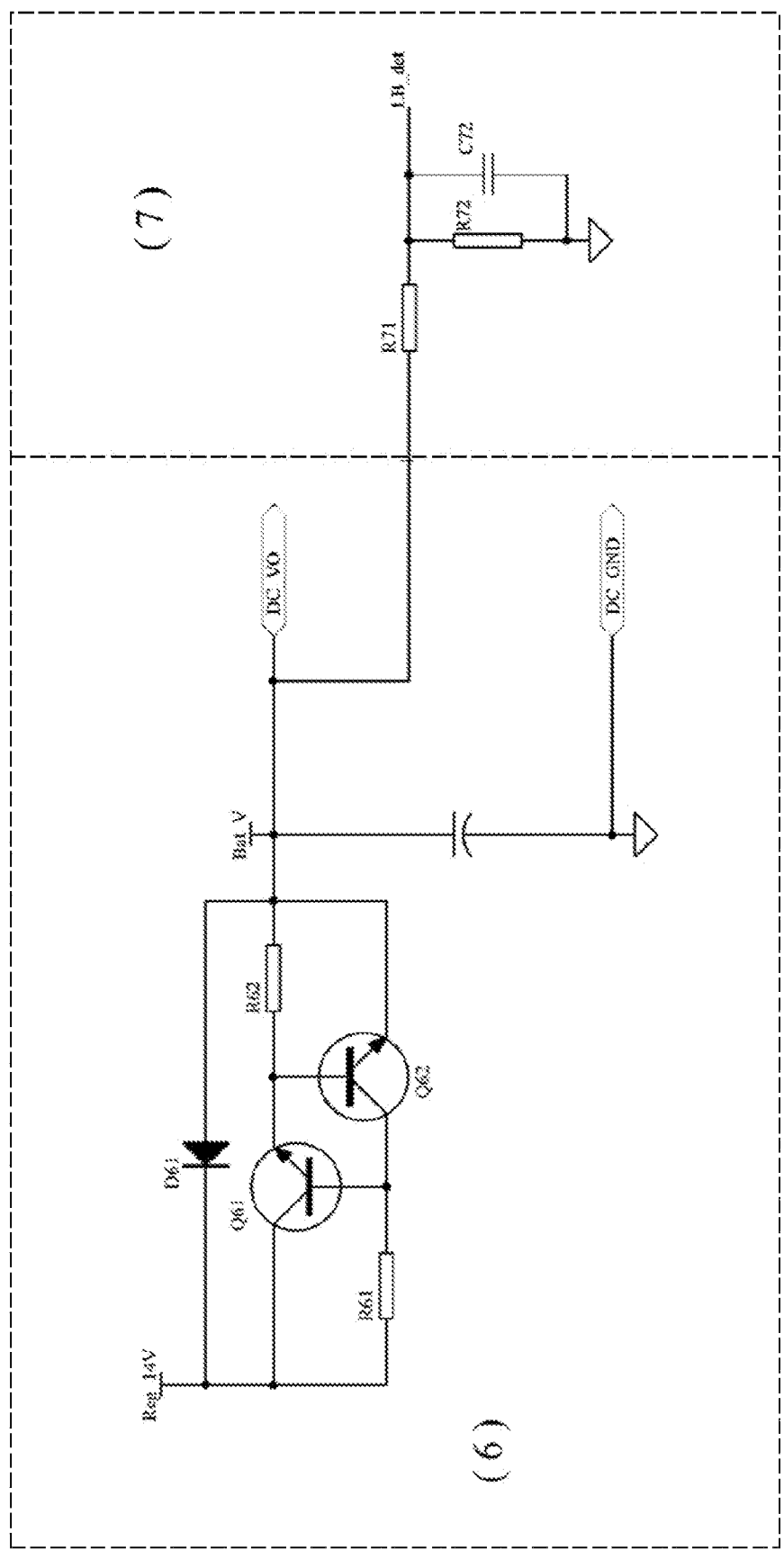
FIG. 20 is a circuit diagram illustrating the current limit circuit and the backup battery voltage detection circuit of the digital power converter of the electric vehicle according to the above preferred embodiment.

Referring to FIG. 4 and FIG. 20, the current limit circuit 6 includes two triodes Q61, Q62, wherein the triode Q61 is turned on by providing bias current from a resistor R61 while a resistor R62 provides another bias current to triode Q62. When the current of the triode Q61 increases, a voltage between two ends of the resistor R62 increases at the same time. When a bias voltage point of the triode Q62 rises beyond a predetermined value, the bias voltage point of the triode Q62 is turned on to reduce a conduction current of the triode Q61, so that the current limit circuit 6 is capable of limiting the current output to a predetermined value.

The current limit circuit 6 further includes two terminals (DC_VO, DC_GND) for connecting to external backup batteries. The triode Q61 provides a constant charging current to charge external batteries. The external backup battery is configured to store power as backup power supply for the digital power converter arrangement. For example, when the external battery is in low voltage state due to power consumption, the current limit circuit 6 is unable to provide low voltage for the operation of the arrangement due to an input voltage thereof is too low, the external backup battery provides a voltage via the diode D61 to supply power to maintain the operation of the arrangement to prevent an uncontrollable condition.

The backup battery voltage detection circuit 7 includes two resistors R71, R72 and a capacitor C72 configured to form a voltage divider circuit, such that the CPU (IC11) detects a status of the external backup battery via the connection line (LB_det) thereof, wherein when the external backup battery is abnormal, an alert is provided to the user through the alarm circuit 12, the LED circuit 11 or an external communication network.

Referring to FIG. 5 and FIG. 18, the output current detection circuit 22 includes three integrated circuits IC221, IC222, IC223 which are current signal amplification ICs, wherein the current flowing through resistors R91, R92, R93 in the three-phase inverter circuit 2 as shown in FIG. 13 causes the resistors R91, R92, R93 generating corresponding changes that the voltages are presented at the connection lines PH1_C, PH2_C, PH3_C as shown in FIG. 18 respectively and being amplified by the integrated circuits IC221, IC222, IC223 respectively. The CPU (IC11) detects three-phase current corresponding voltage signals via the connection lines PH3_CDET, PH2_CDET, PH1_CDET respectively, which are converted into three-phase current data, so as to provide PWM output signal correction according to the three-phase current data. Also, when overload occurs in the output AC power supply mode, the present invention refers to a digital power supply method to perform an overload protection function.

Figure 21:
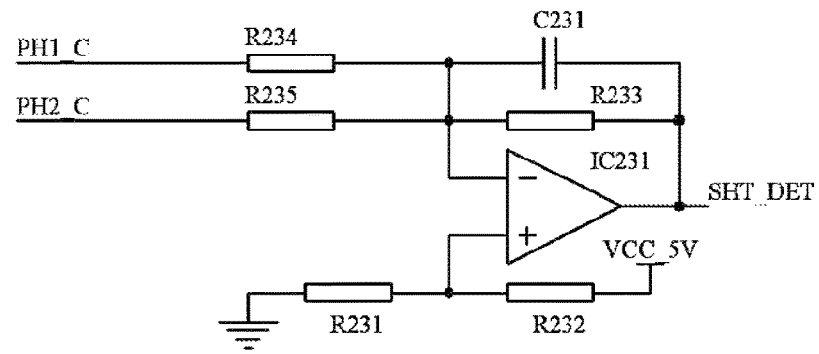
FIG. 21 is a circuit diagram illustrating the output short-circuit currently detection circuit of the digital power converter of the electric vehicle according to the above preferred embodiment.

Referring to FIG. 5 and FIG. 21, the output short-circuit currently detection circuit 23 is illustrated, wherein while preforming output AC power source function, the external load may be short-circuited that causes damages to the power components. The output short-circuit currently detection circuit 23 sets a short-circuit current level at the connection lines (PH1_C, the PH2_C), such that when the current exceeds the short-circuit current level, the integrated circuit IC231 outputs a low voltage, and the voltage dividing resistors R231, R232 determine the detection potential of the short-circuit current level while the resistors R233, R234, R235 determine a magnification of the current with respect to the input voltage. When a short circuit occurs, the present invention refers to a digital power supply to perform a short circuit protection function.

Figure 22:
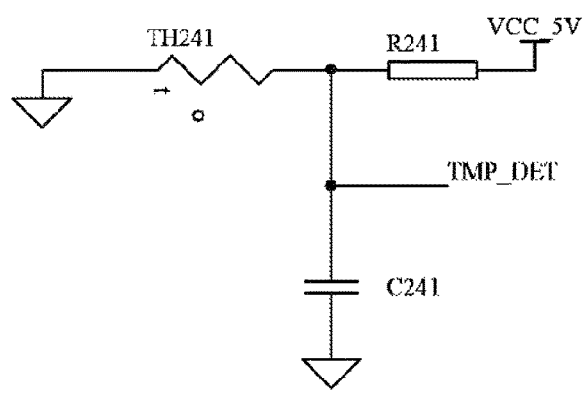
FIG. 22 is a circuit diagram illustrating the temperature detection circuit of the digital power converter of the electric vehicle according to the above preferred embodiment.

Referring to FIG. 5 and FIG. 22, the temperature detection circuit 24 is illustrated, which includes a thermistor TH241 configured to show a change in resistance corresponding to the temperature change under a temperature change state. The thermistor TH241 is in contact with a surface of a heat sink to detect the temperature change of the heat sink. In addition, a voltage circuit composed of a combination of a resistor R241 and the thermistor TH241 shows a voltage change at the connection line (TMP_DET) of the CPU (IC11), such that the CPU (IC11) is able to detect a temperature change information through the connection line (TMP_DET). Thereby, a fan is turned on through the fan control circuit 15 as shown in FIG. 5 to lower the temperature when the temperature rises, and an alert message is output via LED, Alarm or via external network when the temperature is abnormal.

Referring to FIG. 5 and FIG. 15, according to the preferred embodiment, the external communication network interface circuit 14, which is configured to be capable of selecting a variety of communication specifications, includes a CAN interface IC (IC141) and an external communication interface port, wherein the CAN interface IC (IC141) provides a matching function with external CAN bus circuits. While performing communication with the external communication network CAN bus, the CPU (IC11) uses a built-in CAN bus communication module to convert to CAN bus transmission information which can be communicated with the external CAN bus to exchange information through the CAN port after potentiometric matching the CAN interface IC (IC141) with the external CAN bus.

Figure 23:
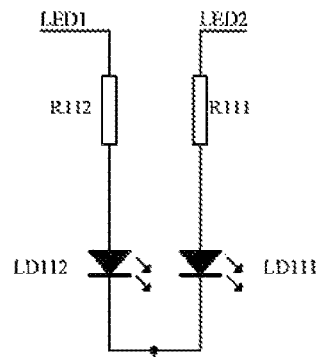
FIG. 23 is a circuit diagram illustrating the LED circuit of the digital power converter of the electric vehicle according to the above preferred embodiment.

Referring to FIG. 5 and FIG. 23, the LED circuit includes one or more LEDs (Light Emitting Elements) LD111, LD112, wherein the CPU (IC11) in different states such as "Standby", "Abnormal Occurrence", "Overload Occurrence", and etc., is configured to output a voltage signal through the resistors R111, R112 to limit current to illuminate the LEDs LD111, LD112 therefor respectively.

Figure 24:
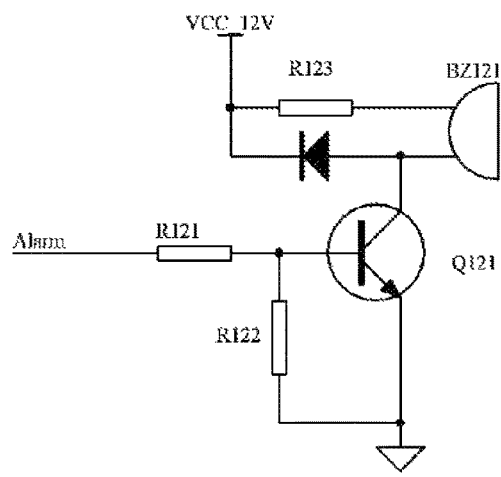
FIG. 24 is a circuit diagram illustrating the alarm circuit of the digital power converter of the electric vehicle according to the above preferred embodiment.

Referring to FIG. 5 and FIG. 24, the alarm circuit 12 is configured to issue alarm audio when an abnormal state occurs during the operation of the arrangement, wherein when the CPU (IC11) detects an abnormality, the CPU (IC11) outputs a signal through the connection line (Alarm) and resistors R121, R122 drive a triode Q121 to have voltage changes at the pin C and pin E thereof corresponding to the signal, so that buzzer audio is generated.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A digital power converter arrangement of an electric vehicle, including:
   at least one external battery;
   at least one external motor; and
   a digital power converter which includes:
   a signal switching IC (Integrated Circuit); and
   a CPU (Central Processor Unit) circuit, configured to execute and perform an analog and digital conversion, a pulse-width modulation (PWM) and communication, including a CPU outputting one or more PWM signals by changing a time ratio of a turn-on/turn-off of square wave pulse width modulation signals;
   a voltage boost circuit which utilizes a software to change IO output states of the one or more PWM signals;
   an AC (Alternate Current) rectifier circuit configured to input an AC power supply, wherein the CPU outputs the one or more PWM signals through the signal switching IC to the voltage boost circuit to raise an AC rectifier voltage to reach an external battery voltage potential of each of the at least one external battery;
   a high voltage filter circuit configured to detect voltage and current data of one or more input terminals of the AC (Alternate Current) rectifier circuit;
   a three-phase inverter circuit configured to expand a power conversion into a three-phase AC output with a three-phase motor driving capability to provide a three-phase power supply with the CPU as a control core to quantitatively analyze and process input and output information and make corresponding adjustments thereof; and
   a function selection circuit, including:
   a function selector switch configured to switch between an external battery charging function mode, an AC power supply output function mode, and an external motor driver function mode; and
   a motor selector switch configured to function a motor hall mode when the function selector switch is switched to the external motor driver function mode, wherein the CPU detects the function selector switch and the motor selector switch to run corresponding functions;
   wherein when the function selector switch is switched to select the external battery charging function mode, the CPU operates in a charging mode; wherein an external AC power is supplied via the AC rectifier circuit and an external AC current thereof is rectified to obtain a DC voltage, wherein the DC voltage is raised by the voltage boost circuit and then feeds to the high voltage filter circuit to filter out any pulsating voltage for charging the at least one external battery;
   wherein when the function selector switch is switched to select the AC power supply function mode that is a power source switching mode, the at least one external battery inputs DC power through the high voltage filter circuit and then switches into the AC power supply through a three-phase driver, wherein the AC power supply raises a voltage thereof by the voltage boost circuit to supplement power loss of the at least one external battery;
   wherein when the function selector switch is switched to select the external motor driver function mode, the high voltage filter circuit is connected with the at least one external battery to input the DC power supply, wherein the CPU sets a driving voltage through an adjustable potentiometer and a rotating speed of the at least one external motor, and that the AC power supply is rectified by the AC rectifier circuit to output a steady direct current for an operation of the at least one external motor.

2. The digital power converter arrangement, as recited in claim 1, wherein the digital power converter further includes a hall sensor interface circuit, wherein when the motor selector switch of the function selection circuit is switched to the motor hall mode, a rotation angle feedback information based on a selection of a three-phase brushless motor of the one or more motor is provided from the hall sensor interface circuit, wherein the fall sensor interface circuit includes three operational amplifiers configured to filter out noise from three-phase hall sensor signals and then reform to a square wave, two fall sensor interface circuit resistors configured to divide a voltage potential for providing a trigger voltage potential that an input signal at an input terminal thereof is a low voltage potential which is lower than the trigger voltage potential, and an output signal at an output terminal thereof is a high voltage potential which is higher than the trigger voltage potential, such that the CPU is able to determine a rotation angle of the at least one external motor according to signal states for processing a computation of PWM signal parameters to correct output PWM signal parameters.

3. The digital power converter arrangement, as recited in claim 2, wherein the digital power converter further includes an external module interface circuit, wherein when the motor selector switch of the function selection circuit is switched to a motor feedback mode, the rotation angle feedback information is provided based on a rotary transformer of the at least one external motor, wherein the feedback information requires the external module interface circuit to decode angular motor information, such that the CPU controls an external module through the external module interface circuit which includes an external module terminal, wherein the CPU is able to connect with a decoding module of the rotary transformer of the external module through the external module terminal, and that the CPU is linked with the external module through a built-in SPI communication module for information exchange, control the status information exchange, and providing a 5V power source.

4. The digital power converter arrangement, as recited in claim 3, wherein the digital power converter further includes an output current detection circuit, wherein when the motor selector switch of the function selection circuit is switched to a motor AC mode, a motor based on no rotation angle feedback is selected, wherein the CPU detects motor current phase information through the output current detection circuit for processing a computation of the PWM signal parameters to correct the output PWM signal parameters.

5. The digital power converter arrangement, as recited in claim 1, wherein the digital power converter further comprises an external communication network interface circuit communicatively linking an external CAN bus based on a CAN bus communication standard and the function selector switch is able to selectively switch to an input control instruction function mode via an external network, wherein when the function selector switch is switched to the input control instruction function mode, a CAN port of the CPU executes a communication operation mode, whereby when the power source is under a "STANDBY" status, an external device is able to transmit control signals and instructions via a CAN bus communication network through the external communication network interface circuit, wherein the CPU is built-in with a communication module to decode the CAN bus inputted information and read control signals and instructions so as to execute functions of the digital power converter of the electric vehicle according to the control signals and instructions.

6. The digital power converter arrangement, as recited in claim 1, wherein the three-phase inverter circuit includes an AC driving circuit which has an integrated circuit configuration including three AC driving integrated circuits and an inverting circuit including a three-phase half bridge circuit composed of first, second, third and fourth filed-effect transistors to output three-phase power.

7. The digital power converter arrangement, as recited in claim 6, wherein when the function selector switch is switched to select the AC power supply function mode, the CPU outputs a SPWM (sine pulse-width modulation) signal that changes the turn on/off time ratio in a proportion of a sine wave, wherein the CPU drives the first and second field-effect transistors of the three-phase inverter circuit through a first driver integrated circuit to form a first half-bridge circuit and the third and fourth field-effect transistors of the three-phase inverter circuit through a second driver integrated circuit to form a second half-bridge circuit.

8. The digital power converter arrangement, as recited in claim 7, wherein the digital power converter circuit further includes a filter circuit, which includes a first filter and a second filter, and an output switching circuit, which includes a first relay and a second relay, wherein the SPWM signal is amplified and presented in a middle connection point of the first relay of the output switching circuit and then is transmitted to the second filter of the filter circuit to filter out high frequency portions through a first inductive capacitor so that a phase sinusoidal alternate current is able to output at a first output terminal, wherein the SPWM signal is also selectively amplified and presented in a middle connection point of the second relay of the output switching circuit and then is transmitted to the first filter of the filter circuit to filter out high frequency portions through a second inductive capacitor so that another phase sinusoidal alternate current is able to output at as second output terminal, wherein the first output terminal and second output terminal are connected and combined into a single-phase sinusoidal AC power supply.

9. The digital power converter arrangement, as recited in claim 4, wherein the three-phase inverter circuit includes an AC driving circuit which has an integrated circuit configuration including three AC driving integrated circuits and an inverting circuit including a three-phase half bridge circuit composed of first, second, third and fourth filed-effect transistors to output three-phase power.

10. The digital power converter arrangement, as recited in claim 9, wherein when the function selector switch is switched to select the AC power supply function mode, the CPU outputs a SPWM signal that changes the turn on/off time ratio in a proportion of a sine wave, wherein the CPU drives the first and second field-effect transistors of the three-phase inverter circuit through a first driver integrated circuit to form a first half-bridge circuit and the third and fourth field-effect transistors of the three-phase inverter circuit through a second driver integrated circuit to form a second half-bridge circuit.

11. The digital power converter arrangement, as recited in claim 10, wherein the digital power converter further includes a filter circuit, which includes a first filter and a second filter, and an output switching circuit, which includes a first relay and a second relay, wherein the SPWM signal is amplified and presented in a middle connection point of the first relay of the output switching circuit and then is transmitted to the second filter of the filter circuit to filter out high frequency portions through a first inductive capacitor so that a phase sinusoidal alternate current is able to output at a first output terminal, wherein the SPWM signal is also selectively amplified and presented in a middle connection point of the second relay of the output switching circuit and then is transmitted to the first filter of the filter circuit to filter out high frequency portions through a second inductive capacitor so that another phase sinusoidal alternate current is able to output at as second output terminal, wherein the first output terminal and second output terminal are connected and combined into a single-phase sinusoidal AC power supply.

12. The digital power converter arrangement, as recited in claim 5, wherein the three-phase inverter circuit includes an AC driving circuit which has an integrated circuit configuration including three AC driving integrated circuits and an inverting circuit including a three-phase half bridge circuit composed of first, second, third and fourth filed-effect transistors to output three-phase power.

13. The digital power converter arrangement, as recited in claim 12, wherein when the function selector switch is switched to select the AC power supply function mode, the CPU outputs a SPWM signal that changes the turn on/off time ratio in a proportion of a sine wave, wherein the CPU drives the first and second field-effect transistors of the three-phase inverter circuit through a first driver integrated circuit to form a first half-bridge circuit and the third and fourth field-effect transistors of the three-phase inverter circuit through a second driver integrated circuit to form a second half-bridge circuit.

14. The digital power converter arrangement, as recited in claim 13, wherein the digital power converter further includes a filter circuit, which includes a first filter and a second filter, and an output switching circuit, which includes a first relay and a second relay, wherein the SPWM signal is amplified and presented in a middle connection point of the first relay of the output switching circuit and then is transmitted to the second filter of the filter circuit to filter out high frequency portions through a first inductive capacitor so that a phase sinusoidal alternate current is able to output at a first output terminal, wherein the SPWM signal is also selectively amplified and presented in a middle connection point of the second relay of the output switching circuit and then is transmitted to the first filter of the filter circuit to filter out high frequency portions through a second inductive capacitor so that another phase sinusoidal alternate current is able to output at as second output terminal, wherein the first output terminal and second output terminal are connected and combined into a single-phase sinusoidal AC power supply.

15. The digital power converter arrangement, as recited in claim 1, wherein the digital power converter further includes a high voltage and a speed setting circuit configured to detect motor speed control data of the at least one external motor.

16. The digital power converter arrangement, as recited in claim 14, wherein the digital power converter further includes a high voltage and a speed setting circuit configured to detect motor speed control data of the at least one external motor.

17. The digital power converter arrangement, as recited in claim 1, wherein the digital power converter includes a high voltage and speed setting circuit which is configured to provide an external motor operation speed setting function and an external motor voltage setting function, wherein by changing a rotation position point of an adjustable resistor, a motor rotating speed control voltage is able to be outputted from a middle connection point of the adjustable resistor to the CPU, wherein at a same time, the CPU reads external motor rotating speed control information and outputs corresponding control signals, wherein an adjustable potentiometer outputs a voltage value corresponding to the high voltage of the high voltage filter circuit, wherein the high voltage is connected with the at least one external battery, and the voltage is equal to the at least one external battery, so that the CPU is able to determine a battery charging voltage by detecting an output voltage of the adjustable potentiometer.

18. The digital power converter arrangement, as recited in claim 16, wherein the digital power converter includes a high voltage and speed setting circuit which is configured to provide an external motor operation speed setting function and an external motor voltage setting function, wherein by changing a rotation position point of an adjustable resistor, a motor rotating speed control voltage is able to be outputted from a middle connection point of the adjustable resistor to the CPU, wherein at a same time, the CPU reads an external motor rotating speed control information and outputs corresponding control signals, wherein an adjustable potentiometer outputs a voltage value corresponding to the high voltage of the high voltage filter circuit, wherein the high voltage is connected with the at least one external battery, and the voltage is equal to the at least one external battery, so that the CPU is able to determine a battery charging voltage by detecting an output voltage of the adjustable potentiometer.

19. The digital power converter arrangement, as recited in claim 1, wherein the digital power converter further includes an output current detection circuit which is configured to extract three-phase current data detected by the CPU so as to provide a PWM output signal correction according to three-phase current data.

20. The digital power converter arrangement, as recited in claim 19, wherein the output current detection circuit includes first, second and third resistors and first, second and third output current detection integrated circuits which are current signal amplification ICs, wherein three current flowing through resistors in the three-phase inverter circuit causes the first, second and third resistors generating corresponding changes that corresponding voltages presented at corresponding connection lines of the CPU are amplified by the first, second and third output current detection integrated circuits respectively, wherein the CPU detects a three-phase current corresponding voltage signals which are converted into three-phase current data, so as to provide the PWM output signal correction according to the three-phase current data.

21. The digital power converter arrangement, as recited in claim 18, wherein the digital power converter further includes an output current detection circuit which is configured to extract three-phase current data detected by the CPU so as to provide a PWM output signal correction according to three-phase current data, wherein the output current detection circuit includes first, second and third resistors and first, second and third output current detection integrated circuits which are current signal amplification ICs, wherein three current flowing through resistors in the three-phase inverter circuit causes the first, second and third resistors generating corresponding changes that corresponding voltages presented at corresponding connection lines of the CPU are amplified by the first, second and third output current detection integrated circuits respectively, wherein the CPU detects a three-phase current corresponding voltage signals which are converted into the three-phase current data, so as to provide the PWM output signal correction according to the three-phase current data.

* * * * *